US010969285B2

(12) United States Patent
Ogawa et al.

(10) Patent No.: US 10,969,285 B2
(45) Date of Patent: Apr. 6, 2021

(54) ENGINE TORQUE ESTIMATING DEVICE, ENGINE CONTROL SYSTEM, AND ENGINE TORQUE ESTIMATION METHOD

(71) Applicant: FUJITSU LIMITED, Kawasaki (JP)

(72) Inventors: Masatoshi Ogawa, Zama (JP); Hiromitsu Soneda, Atsugi (JP); Noriyasu Aso, Isehara (JP); Takeo Kasajima, Machida (JP)

(73) Assignee: FUJITSU LIMITED, Kawasaki (JP)

(*) Notice: Subject to any disclaimer, the term of this patent is extended or adjusted under 35 U.S.C. 154(b) by 205 days.

(21) Appl. No.: 16/129,025

(22) Filed: Sep. 12, 2018

(65) Prior Publication Data
US 2019/0011319 A1 Jan. 10, 2019

Related U.S. Application Data

(63) Continuation of application No. PCT/JP2016/058806, filed on Mar. 18, 2016.

(51) Int. Cl.
*G01M 15/04* (2006.01)
*G01L 5/26* (2006.01)
(Continued)

(52) U.S. Cl.
CPC ............. *G01L 5/26* (2013.01); *F02D 35/023* (2013.01); *F02D 41/0097* (2013.01);
(Continued)

(58) Field of Classification Search
CPC ....... G01L 5/26; G01M 15/044; G01M 15/05; G01M 15/08; F02D 2200/1002; F02D 2200/1004
(Continued)

(56) References Cited

U.S. PATENT DOCUMENTS 8,166,951 B2 * 5/2012 Takahashi ........... F02D 41/0097
123/436
2006/0106526 A1 5/2006 Sugita et al.
(Continued)

FOREIGN PATENT DOCUMENTS

EP 2894320 A1 7/2015
JP 2-188676 7/1990
(Continued)

OTHER PUBLICATIONS

International Search Report and Written Opinion of the International Searching Authority, mailed in connection with PCT/JP2016/058806 and dated May 10, 2016 (11 pages).
(Continued)

*Primary Examiner* — Eric S. McCall
(74) *Attorney, Agent, or Firm* — Fujitsu Patent Center

(57) ABSTRACT

An engine torque estimating system includes: an engine; a crank angle sensor installed for a crankshaft of an engine; an acquiring circuit for acquiring, from the crank angle sensor, a chronological waveform in which amplitude changes based on a rotational speed of the crankshaft; a generating circuit for generating input data to a mathematical model based on information of the amplitude of the chronological waveform; a calculating circuit for calculating an estimated value of engine torque by giving the generated input data to the mathematical model; and a control circuit for controlling the engine based on the estimated value of engine torque.

18 Claims, 21 Drawing Sheets

(51) Int. Cl.
  *F02D 35/02*    (2006.01)
  *G01M 15/05*    (2006.01)
  *G01M 15/08*    (2006.01)
  *F02D 41/00*    (2006.01)
  *F02D 41/14*    (2006.01)
  *G01P 3/488*    (2006.01)

(52) U.S. Cl.
  CPC ....... *F02D 41/1497* (2013.01); *G01M 15/044* (2013.01); *G01M 15/05* (2013.01); *G01M 15/08* (2013.01); *F02D 2041/1423* (2013.01); *F02D 2200/1004* (2013.01); *G01P 3/488* (2013.01)

(58) Field of Classification Search
  USPC ....................................................... 73/114.15
  See application file for complete search history.

(56) References Cited

U.S. PATENT DOCUMENTS

| | | | | |
|---|---|---|---|---|
| 2007/0100534 | A1* | 5/2007 | Katsumata | F02D 35/026 701/103 |
| 2008/0319725 | A1 | 12/2008 | Chauvin et al. | |
| 2009/0100919 | A1* | 4/2009 | Sugita | F02D 41/1497 73/114.15 |
| 2009/0100920 | A1 | 4/2009 | Sakayanagi | |
| 2011/0238255 | A1* | 9/2011 | Sano | B60R 16/0236 701/31.4 |
| 2012/0158320 | A1 | 6/2012 | Nishida et al. | |
| 2015/0291004 | A1* | 10/2015 | Watanabe | F02D 41/1497 417/34 |
| 2016/0069768 | A1* | 3/2016 | Johansson | F02D 41/04 702/41 |
| 2016/0333802 | A1* | 11/2016 | Akazaki | F02D 41/1497 |
| 2017/0115172 | A1* | 4/2017 | Ogawa | F02D 41/28 |
| 2019/0003411 | A1* | 1/2019 | Aso | F02D 41/1402 |

FOREIGN PATENT DOCUMENTS

| | | |
|---|---|---|
| JP | 63-71551 | 3/1998 |
| JP | 2005-308712 | 11/2005 |
| JP | 2008-175077 | 7/2008 |
| JP | 2009-509089 | 3/2009 |
| JP | 2012-127331 | 7/2012 |
| JP | 2012-188930 | 10/2012 |
| JP | 2015-129442 | 7/2015 |
| WO | 2006/120728 | 11/2006 |
| WO | 2008/087928 | 7/2008 |

OTHER PUBLICATIONS

JPOA—Office Action of Japanese patent application No. 2018-505205 dated Mar. 19, 2019 with Machine Translation.

\* cited by examiner

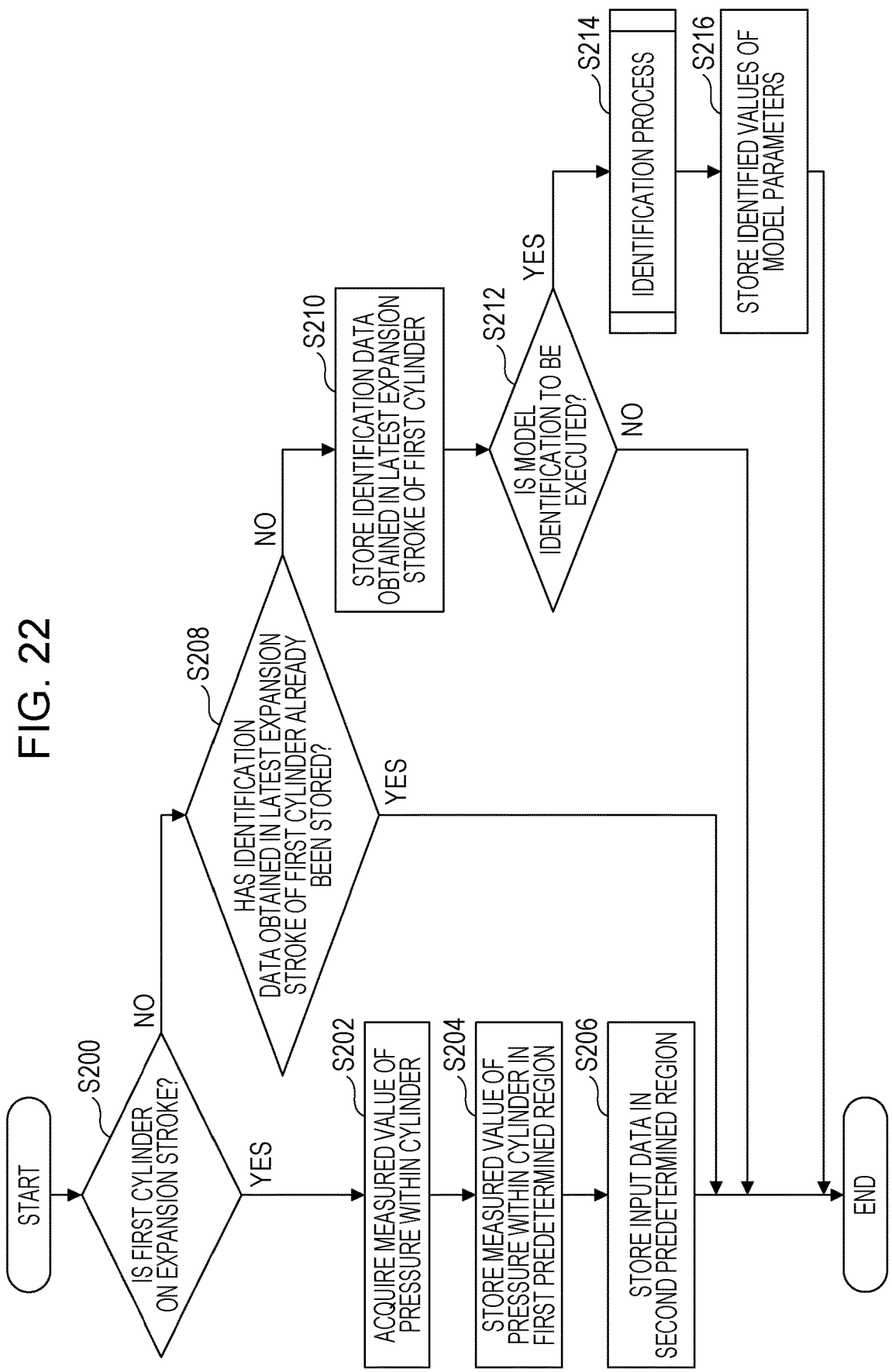

ENGINE TORQUE ESTIMATING DEVICE, ENGINE CONTROL SYSTEM, AND ENGINE TORQUE ESTIMATION METHOD

CROSS-REFERENCE TO RELATED APPLICATION

This application is a continuation application of International Application PCT/JP2016/058806 filed on Mar. 18, 2016 and designated the U.S., the entire contents of which are incorporated herein by reference.

FIELD

The embodiments discussed herein are related to an engine torque estimating device, an engine control system, and an engine torque estimation method.

BACKGROUND

A technique for calculating an estimated value of indicated torque of an engine based on angular acceleration (hereinafter referred to as "crank angular acceleration") of a crankshaft that has been calculated from a crank angle signal of a crank angle sensor is known. An example of related art is International Publication Pamphlet No. WO2008/087928.

It is, however, difficult to accurately calculate the crank angular acceleration from the crank angle signal of the crank angle sensor due to measurement resolution for angle extraction by the crank angle sensor, a limit of sampling cycles, disturbance such as vibration in a high rotation range, and the like. Thus, in the conventional technique, it is difficult to improve the accuracy of the estimated value of the indicated torque based on the crank angular acceleration.

According to an aspect, an object of the present disclosure is to improve the accuracy of an estimated value of engine torque.

SUMMARY

According to an aspect of the invention, an engine torque estimating system includes: an engine; a crank angle sensor installed for a crankshaft of an engine; an acquiring circuit for acquiring, from the crank angle sensor, a chronological waveform in which amplitude changes based on a rotational speed of the crankshaft; a generating circuit for generating input data to a mathematical model based on information of the amplitude of the chronological waveform; a calculating circuit for calculating an estimated value of engine torque by giving the generated input data to the mathematical model; and a control circuit for controlling the engine based on the estimated value of engine torque.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 is a flowchart of an example of the flow of a model identification process by the engine torque estimating device according to the second embodiment.

DESCRIPTION OF EMBODIMENTS

Hereinafter, embodiments are described in detail with reference to the accompanying drawings.

First Embodiment

Figure 1:
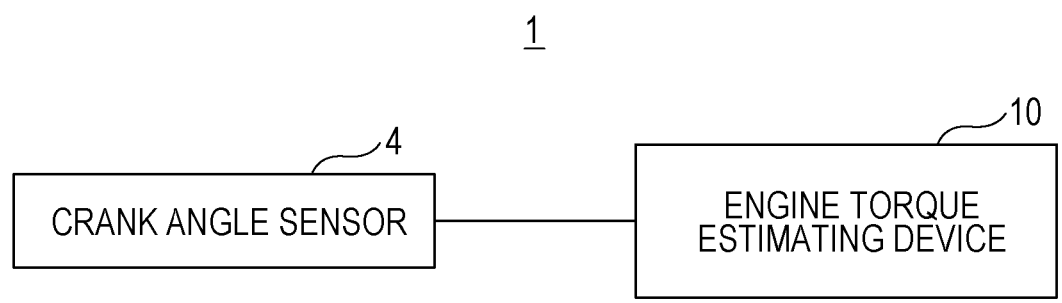
FIG. 1 is a configuration diagram illustrating an example of an engine torque estimation system according to a first embodiment.

FIG. 1 is a configuration diagram illustrating an example of an engine torque estimation system 1 according to a first embodiment.

The engine torque estimation system 1 is installed in a vehicle having an engine (not illustrated). The vehicle may be a vehicle using only the engine as a driving source or may be a hybrid vehicle using an electric motor and the engine as a driving source. The type of the engine is arbitrary. The engine may be a gasoline engine or a diesel engine.

The engine torque estimation system 1 includes a crank angle sensor 4 and an engine torque estimating device 10.

The crank angle sensor 4 is attached to the engine. The crank angle sensor 4 outputs a crank angle signal based on a crank angle that is a rotational angle of a crankshaft (not illustrated) of the engine. For example, the crank angle sensor 4 collaborates with a signal rotor (crank rotor) 5 fixed to the crankshaft to generate the crank angle signal. The signal rotor 5 (refer to FIG. 2) has protrusions (teeth) arranged on an outer circumference at intervals, each corresponding to a predetermined crank angle pitch $\Delta\theta$ (for example, an interval of 6 CA (Crank Angle) degrees), and may have a toothless portion (not illustrated) for detection of a top dead center. In the first embodiment, the signal rotor 5 has the toothless portion as an example.

Figure 2:
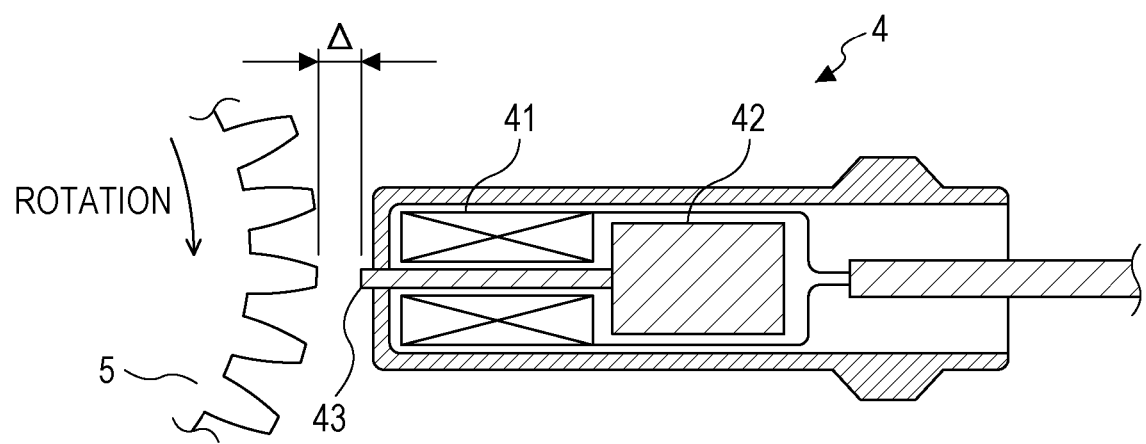
FIG. 2 is an explanatory diagram illustrating an example of a crank angle sensor.

In the first embodiment, as an example, the crank angle sensor 4 is of a magnetic pickup type, as illustrated in FIG. 2. In the example illustrated in FIG. 2, the crank angle sensor 4 includes a detection coil 41, a magnet 42, and a poll piece 43. FIG. 2 is a schematic cross-sectional diagram illustrating the crank angle sensor 4 and illustrating the signal rotor 5 in association with the crank angle sensor 4. In the example illustrated in FIG. 2, the signal rotor 5 is a magnetic involute gear. When the signal rotor 5 is rotated, each of the teeth of the magnetic signal rotor 5 repeatedly approaches and recedes from the poll piece 43. By this operation, the state of a magnetic path formed by the magnet 42 and the poll piece 43 is changed and a magnetic flux extending through the detection coil 41 is changed. Specifically, when a tooth of the signal rotor 5 approaches the poll piece 43 due to the rotation of the signal rotor 5, the magnetic flux extending through the detection coil 41 is increased. When the tooth of the signal rotor 5 recedes from the poll piece 43 due to the rotation of the signal rotor 5, the magnetic flux extending through the detection coil 41 is reduced. The increase and reduction in the magnetic flux extending through the detection coil 41 are repeated. Induced electromotive force V generated in the detection coil 41 is expressed as follows.

$$V = -N \cdot \frac{d\phi_m}{dt} \quad \text{Equation 1}$$

Figure 3:
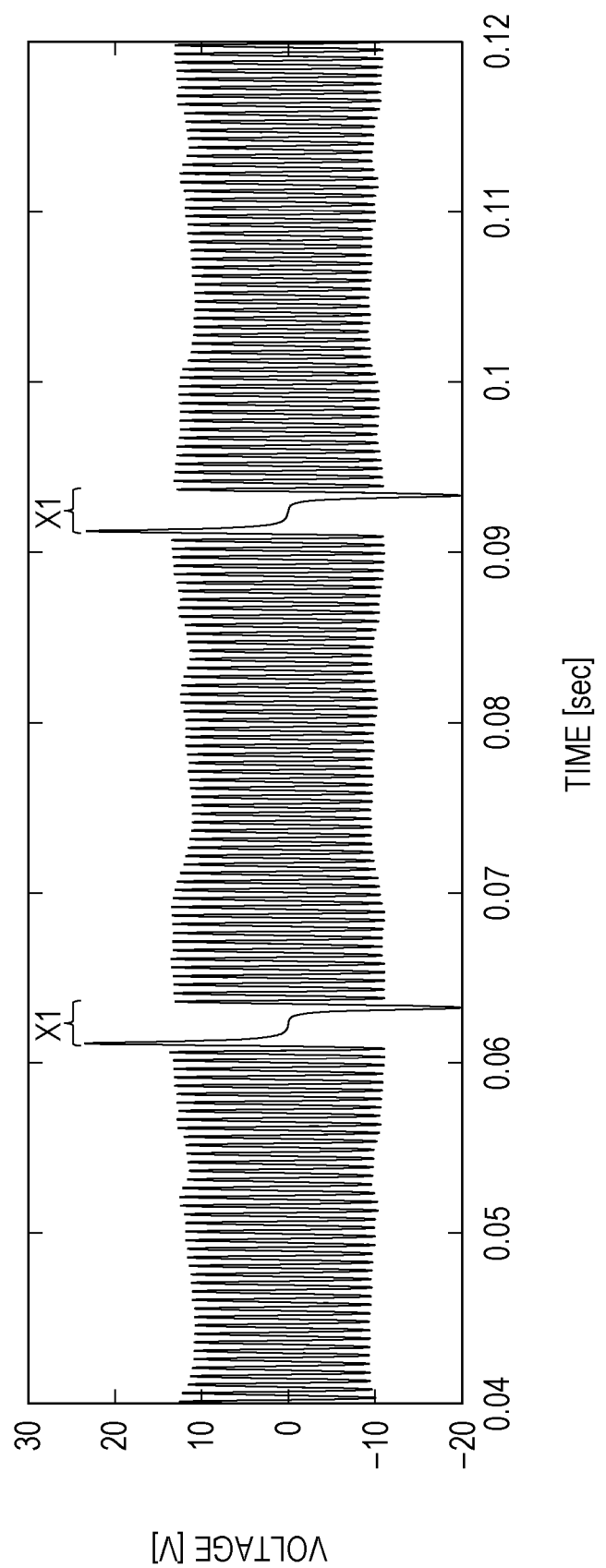
FIG. 3 is a diagram illustrating an example of a waveform of a crank angle signal.

In Equation 1, N is the number of turns of the coil, and $\phi_m$ is the magnetic flux extending through the detection coil 41. The induced electromotive force V changes due to the rotation of the signal rotor 5, as illustrated in FIG. 3. The waveform of the induced electromotive force V that is illustrated in FIG. 3 is extracted as an output signal (crank angle signal) of the crank angle sensor 4. In FIG. 3, portions indicated by X1 indicate waveform characteristics caused by the toothless portion of the signal rotor 5. A section included in the output signal of the crank angle sensor 4 and related to the toothless portion of the signal rotor 5 is hereinafter also referred to as "toothless section". As illustrated in FIG. 3, the crank angle signal includes the toothless section for the detection of the top dead center and a section in which maximum points and minimum points of amplitude occur in a crank angle range of 0 to 720 CA degrees while the value of the crank angle signal is periodically increased from negative to positive through 0 V (or crosses 0 V) and reduced from positive and negative through 0 V (or crosses 0 V) due to the rotation of the crankshaft. The section in which the maximum points and minimum points of the amplitude occur in the crank angle range of 0 to 720 CA degrees while the value of the crank angle signal crosses 0 V due to the rotation of the crankshaft is hereinafter also referred to as "non-toothless section". In the non-toothless section, every time the crank angle signal is increased from negative to positive through 0 V, the crank angle signal is advanced by a predetermined crank angle pitch $\Delta\theta$.

The engine torque estimating device 10 calculates estimated values of indicated torque based on the crank angle signal from the crank angle sensor 4 as described later. A method for calculating the estimated values of the indicated torque is described later. For example, the engine torque estimating device 10 may be implemented in an engine control device that controls the engine. Alternatively, the engine torque estimating device 10 may be connected to the engine control device (refer to FIG. 19). In this case, the engine torque estimating device 10 supplies, to the engine control device, the estimated values of the indicated torque obtained in a method described later.

Figure 4:
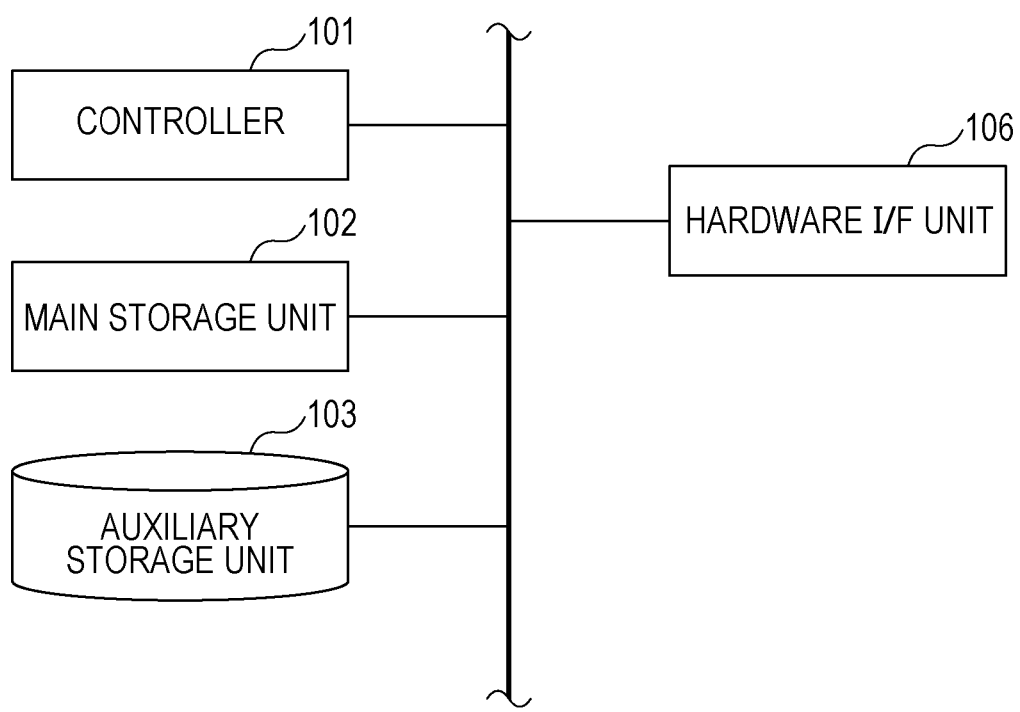
FIG. 4 is a diagram illustrating an example of a hardware configuration of an engine torque estimating device.

FIG. 4 is a diagram illustrating an example of a hardware configuration of the engine torque estimating device 10. Hardware of the engine torque estimating device 10 may include a microcomputer, a field programmable gate array (FPGA), a programmable logic controller (PLC), and the like, for example.

In the example illustrated in FIG. 4, the engine torque estimating device 10 includes a controller 101, a main storage unit 102, an auxiliary storage unit 103, and a hardware I/F unit 106.

The controller 101 is an arithmetic device that executes programs stored in the main storage unit 102 and the auxiliary storage unit 103. The controller 101 receives data from the storage units, computes and processes the data, and outputs the data to the storage units and the like. For example, the controller 101 may include a central processing unit (CPU), a timer counter, and the like.

The main storage unit 102 includes a read only memory (ROM), a random access memory (RAM), and the like and is a storage device that stores or temporarily stores data and programs such as application software to be executed by the controller 101.

The auxiliary storage unit 103 is an electric-erasable programmable read-only memory (EEPROM) or the like and is a storage device that stores data on the application software and the like.

The hardware I/F unit 106 is an interface with a vehicle network (for example, a controller area network (CAN) or the like) connected via either or both of a cable and a wireless line and a peripheral device (for example, the crank angle sensor 4 or the like) of the engine.

In the example illustrated in FIG. 4, various processes described below may be achieved by causing the controller 101 to execute a program.

Figure 5:
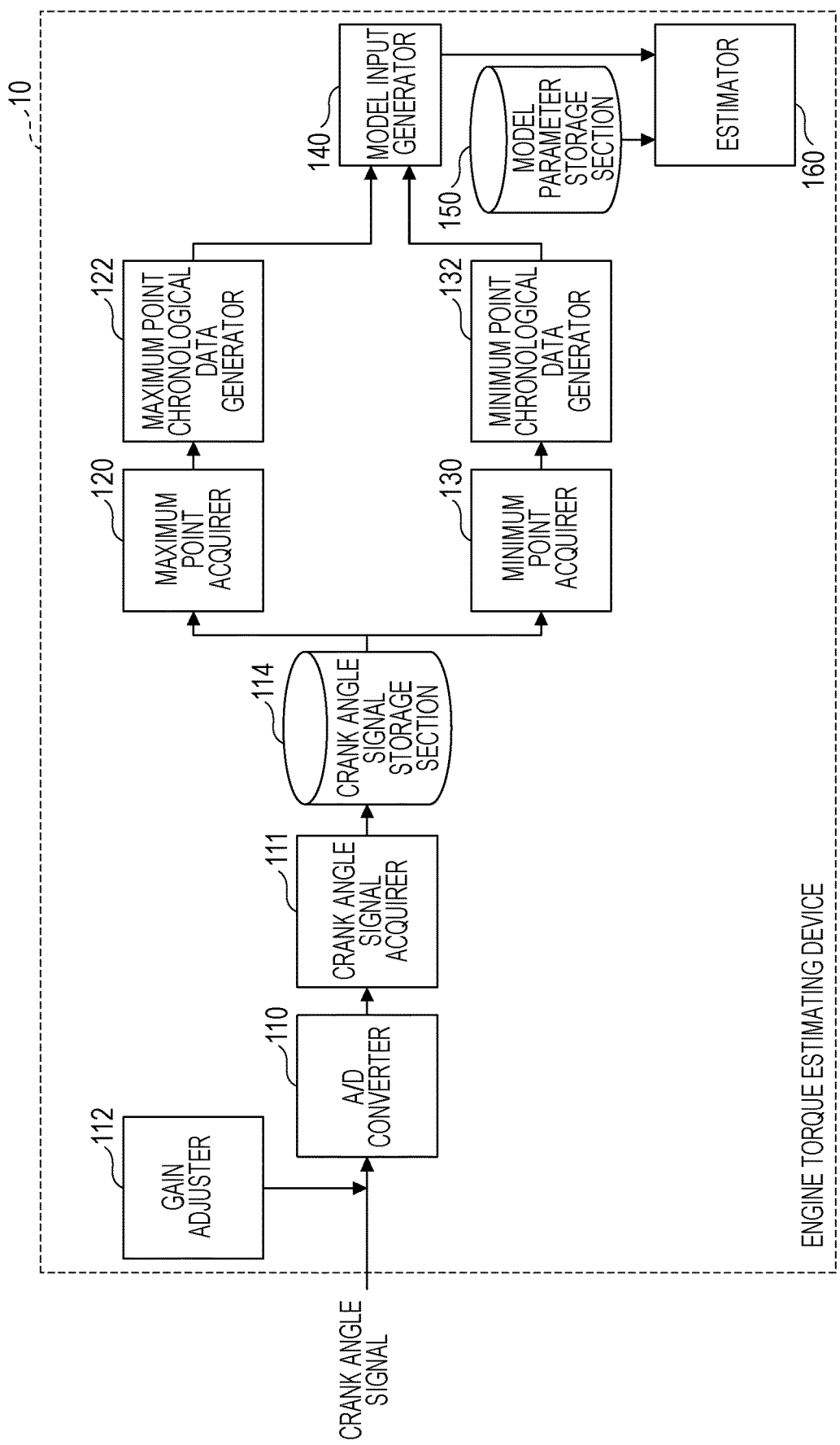
FIG. 5 is a functional block diagram of the engine torque estimating device according to the first embodiment.

FIG. 5 is a functional block diagram of the engine torque estimating device 10 according to the first embodiment.

The engine torque estimating device 10 includes an analog-to-digital (A/D) converter 110, a crank angle signal acquirer 111 (an example of an acquirer), a gain adjuster 112, and a crank angle signal storage section 114. The engine torque estimating device 10 also includes a maximum point acquirer 120, a maximum point chronological data generator 122 (an example of a first chronological data generator), a minimum point acquirer 130, a minimum point chronological data generator 132 (an example of a second chronological data generator), a model input generator 140, a model parameter storage section 150, and an estimator 160. The sections 111, 112, 120, 122, 130, 132, 140, and 160 may be achieved by causing the controller 101 to execute a program stored in the main storage unit 102. In addition, the crank angle signal storage section 114 may be achieved by the RAM of the main storage unit 102. Furthermore, the model parameter storage section 150 may be achieved by the main storage unit 102 or the auxiliary storage unit 103.

The A/D converter 110 converts analog input related to the crank angle signal from the crank angle sensor 4 to quantized output. The quantized output obtained via the A/D converter 110 is hereinafter referred to as "crank angle signal values". A chronological waveform of the crank angle signal values includes the toothless section for the detection of the top dead center and the section (non-toothless section) in which the maximum points and minimum points of the amplitude occur in the crank angle range of 0 to 720 CA degrees while the value of the crank angle signal crosses 0 V due to the rotation of the crankshaft.

The crank angle signal acquirer 111 causes multiple crank angle signal values obtained during the latest predetermined time period to be stored in the crank angle signal storage section 114, for example. In the first embodiment, as an example, the predetermined time period corresponds to a time period up to the current time and is a time period in which the value of the crank angle signal is increased from a value lower than a predetermined threshold Th1 to a value higher than the predetermined threshold Th1 a predetermined number of times. In the first embodiment, as an example, the threshold Th1 is 0 V. In addition, the predetermined number of times is 2 or more. In the first embodiment, as an example, the predetermined number of times is 31.

Figure 6:
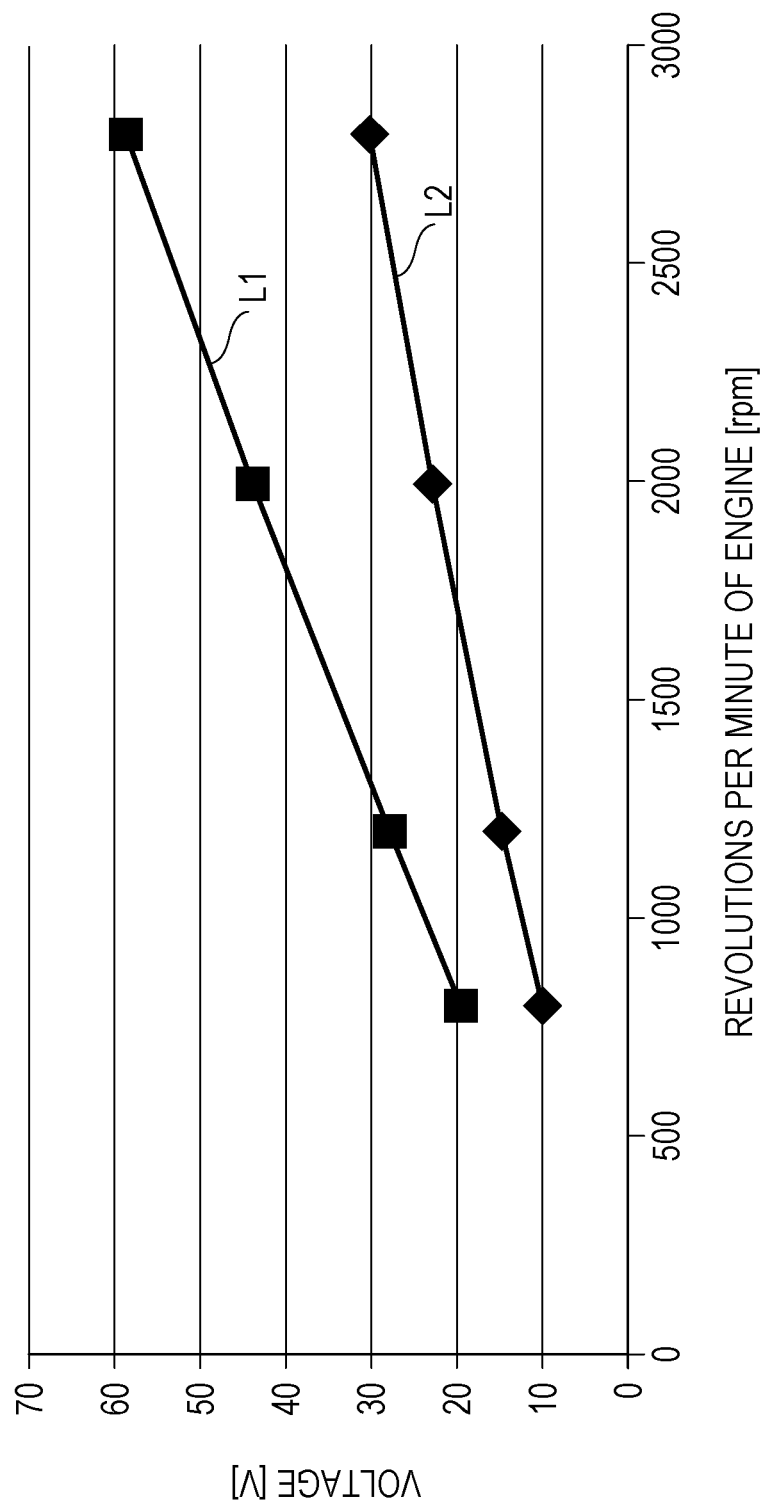
FIG. 6 is an explanatory diagram illustrating output voltage characteristics of the crank angle sensor.

The gain adjuster 112 adjusts a gain K for the crank angle signal to be input to the A/D converter 110. Specifically, the gain adjuster 112 multiplies voltage output (crank angle signal) of the crank angle sensor 4 by the gain K to adjust the gain K in order to correct the voltage output. Specifically, the gain adjuster 112 adjusts the gain K so that an output voltage characteristic of the crank angle sensor 4 matches a standard characteristic. This is due to the fact that the output voltage characteristic of the crank angle sensor 4 depends on a set gap A (refer to FIG. 2) between the crank angle sensor 4 and the signal rotor 5 or the like and may vary depending on the crank angle sensor 4. The standard characteristic is an output voltage characteristic of the crank angle sensor 4 that outputs input data to be used upon model identification described later, for example. The output voltage characteristic of the crank angle sensor 4 is a characteristic for revolutions per minute of the engine as illustrated in FIG. 6. In FIG. 6 illustrating two characteristics L1 and L2, the abscissa indicates revolutions per minute (rpm) of the engine and the ordinate indicates a voltage (V). Revolutions per minute of the engine that is indicated by the abscissa is based on data indicating revolutions per minute of the engine and obtained from the result of detecting the toothless portion of the signal rotor 5. The characteristic L1 is obtained by plotting the maximum amplitude of the toothless section (refer to the portions indicated by X1 in FIG. 3). The characteristic L2 is obtained by plotting the maximum amplitude of the non-toothless section. The output voltage characteristic of the crank angle sensor 4 indicates linear characteristics (characteristics in which the amplitude increases for an increase proportional to the amount of an increase in revolutions per minute of the engine) indicating proportional relationships. Thus, the gain adjuster 112 may adjust the magnitude of the gain K so that the inclination of the linear characteristic is equal to or nearly equal to the inclination of the standard characteristic.

In the example illustrated in FIG. 5, the gain adjuster 112 adjusts the gain K for the crank angle signal to be input to the A/D converter 110, but is not limited to this. For example, the gain adjuster 112 may adjust a gain for the crank angle signal values obtained via the A/D converter 110 in the same manner. The gain adjuster 112 may be installed at an arbitrary position as long as the gain adjuster 112 adjusts the magnitude (gain) of each of values of input data (described later) generated by the model input generator 140 described later.

The crank angle signal storage section 114 stores multiple crank angle signal values (a chronological waveform of the crank angle signal values) obtained during the latest predetermined time period, as described above.

Figure 7:
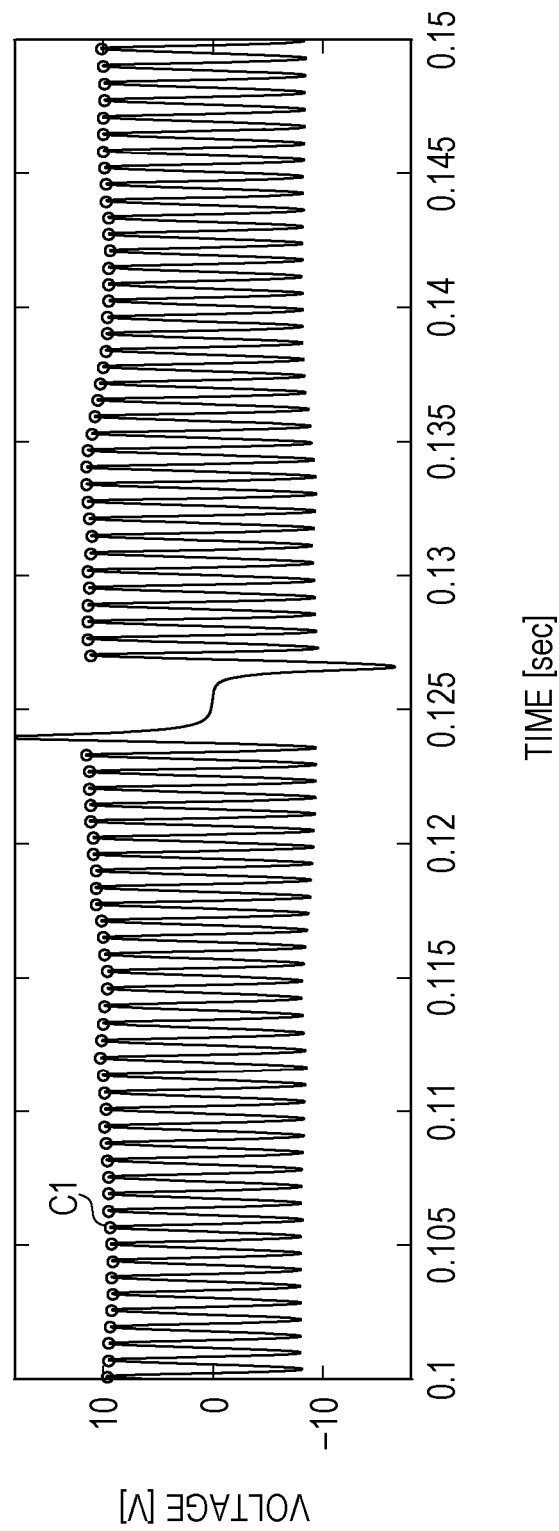
FIG. 7 is an explanatory diagram illustrating an example of maximum point data.

The maximum point acquirer 120 detects maximum points (points at which the amplitude is maximal) of the chronological waveform of the crank angle signal values based on data indicating the crank angle signal values and stored in the crank angle signal storage section 114 and generates maximum point data including the detected maximum points. In this case, the maximum point acquirer 120 does not detect a maximum point of the non-toothless section (refer to the portions indicated by X1 in FIG. 3). For example, the maximum point acquirer 120 detects maximum points in sections (hereinafter also referred to as "positive sections") from time when the chronological waveform of the crank angle signal values becomes equal to or larger than a predetermined threshold Th2 to time when the chronological waveform of the crank angle signal values becomes equal to or smaller than the predetermined threshold Th2. For example, the predetermined threshold Th2 may be 0 V. FIG. 7 is an explanatory diagram illustrating maximum points in non-toothless sections. In FIG. 7, the maximum points are indicated by white circles, and one of the maximum points is indicated by a reference symbol C1. Each of the maximum points occurs in any of the non-toothless sections when the distance between the poll piece 43 and a tooth of the signal rotor 5 that is closest to the poll piece 43 becomes smallest, as described above.

Figure 8:
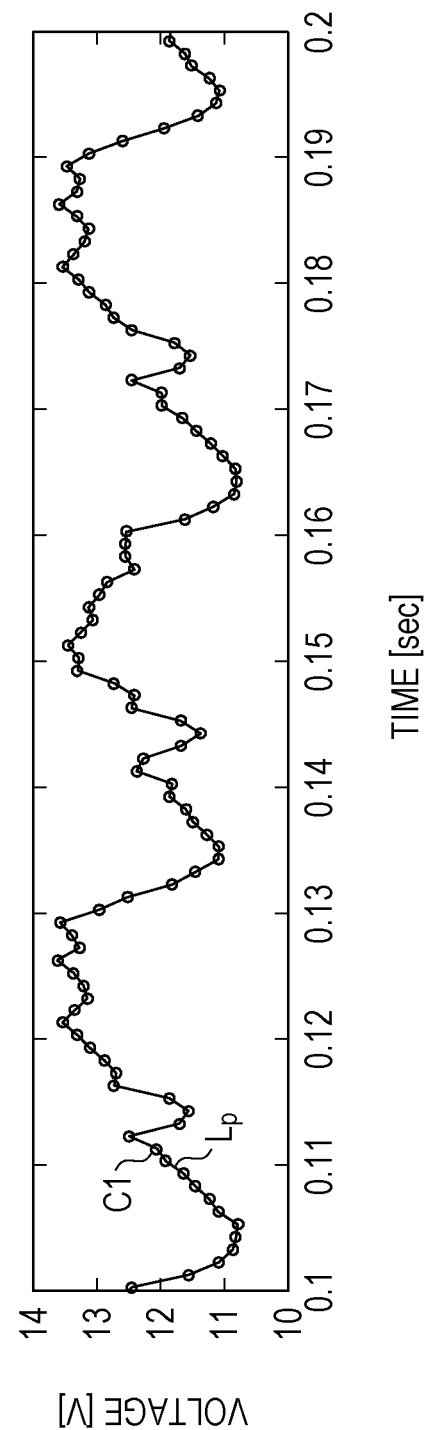
FIG. 8 is an explanatory diagram illustrating an example of chronological data of maximum values of amplitude.

The maximum point chronological data generator 122 generates chronological data of maximum values (maximum values of the amplitude) based on the maximum points (maximum point data) calculated by the maximum acquirer 120. In this case, as described above, the maximum points discretely occur and intervals (time intervals) at which the maximum points occur change depending on the rotational speed (or engine revolutions per minute) of the signal rotor 5. The maximum point chronological data generator 122 interpolates the maximum point data using chronological data to generate chronological data of the maximum values in order to fill empty spaces between the maximum points on a time axis with the generated chronological data. In the first embodiment, as an example, linear interpolation is executed to connect the maximum points to each other using straight lines. Specifically, the maximum point chronological data generator 122 calculates each of the straight lines connecting the maximum points adjacent to each other on the time axis to each other. The straight lines calculated in this manner indicate linear relationships between time and voltage values (voltage values corresponding to the maximum values) in each of the entire positive sections. FIG. 8 is an explanatory diagram illustrating an example of the chronological data of the maximum values. In FIG. 8, the maximum points are indicated by white circles, one of the maximum points is indicated by the reference symbol C1, and one of the straight lines related to the linear interpolation is indicated by a reference symbol $L_p$. Interpolation to be executed on a section succeeding the latest maximum point may be achieved by extrapolation executed to expand a straight line connecting the latest maximum point to a maximum point immediately preceding the latest maximum point to the current time point.

Figure 9:
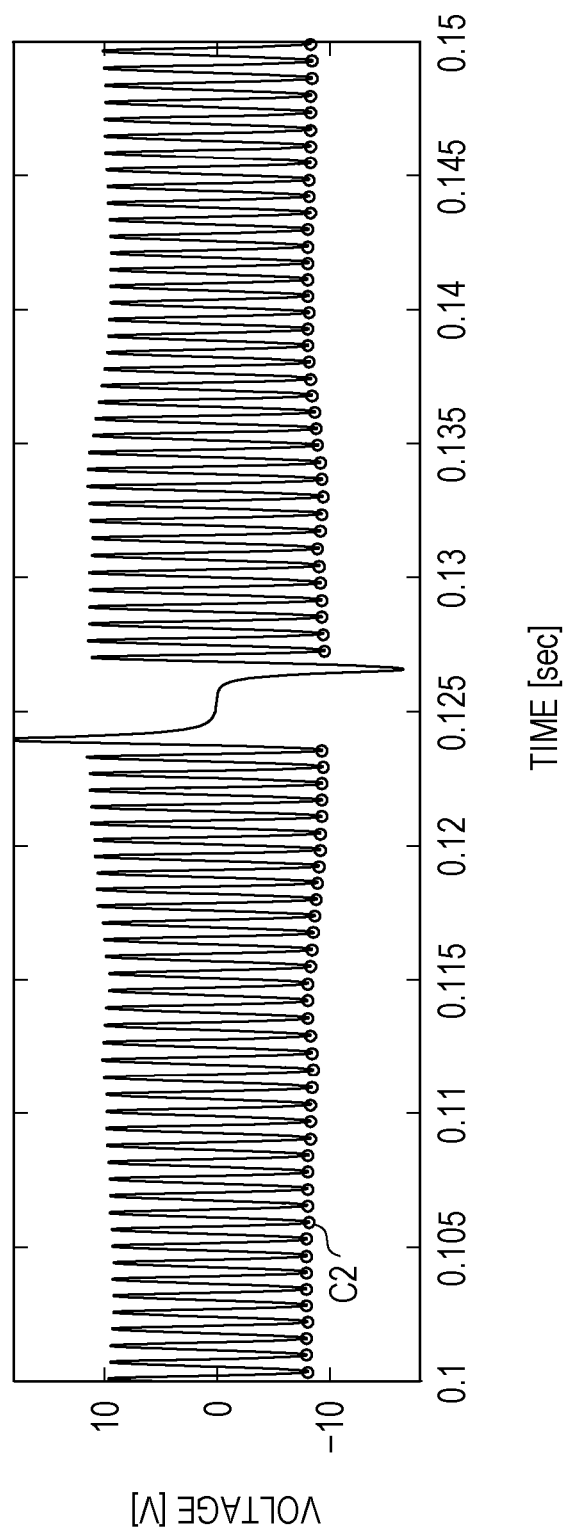
FIG. 9 is an explanatory diagram illustrating an example of minimum point data.

The minimum point acquirer 130 detects minimum points (points at which the amplitude is minimal) of the chronological waveform of the crank angle signal values based on the data indicating the crank angle signal values and stored in the crank angle signal storage section 114 and generates minimum point data including the detected minimum points. In this case, the minimum point acquirer 130 does not detect a minimum point of the toothless section (refer to portions indicated by X1 in FIG. 3). For example, the minimum point acquirer 130 detects minimum points in sections (hereinafter also referred to as "negative sections") from time when the chronological data of the crank angle signal values becomes equal to or smaller than a threshold Th3 to time when the chronological data of the crank angle signal values becomes equal to or larger than the threshold Th3 in each of the non-toothless sections. The predetermined threshold Th3 may be 0 V, for example. FIG. 9 is an explanatory diagram illustrating minimum points in the non-toothless sections. In FIG. 9, the minimum points are indicated by white circles, and one of the minimum points is indicated by a reference symbol C2. Each of the minimum points occurs in any of the non-toothless sections when the distance between the poll piece 43 and a tooth of the signal rotor 5 that is closest to the poll piece 43 becomes largest, as described above.

Figure 10:
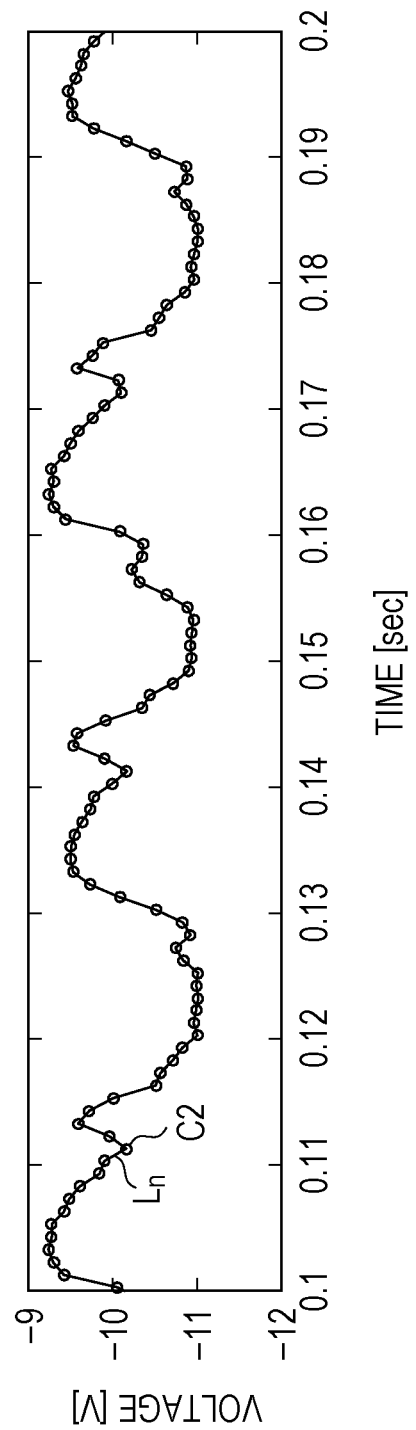
FIG. 10 is an explanatory diagram illustrating an example of chronological data of minimum values of the amplitude.

The minimum point chronological data generator 132 generates chronological data of minimum values (minimum values of the amplitude) based on the minimum points (minimum point data) calculated by the minimum point acquirer 130. Similarly, the minimum point chronological data generator 132 interpolates the minimum point data using chronological data to generate chronological data of the minimum values in order to fill empty spaces between the minimum points on the time axis with the generated chronological data. In the first embodiment, as an example, linear interpolation is executed to connect the minimum points to each other using straight lines. Specifically, the minimum point chronological data generator 132 calculates each of the straight lines connecting the minimum points adjacent to each other on the time axis to each other. The straight lines calculated in this manner indicate linear relationships between time and voltage values (voltage values corresponding to the minimum values) in each of the negative sections. FIG. 10 is an explanatory diagram illustrating an example of the chronological data of the minimum values. In FIG. 10, the minimum points are indicated by white circles, one of the minimum points is indicated by a reference symbol C2, and one of the straight lines related to the linear interpolation is indicated by a reference symbol $L_n$. Interpolation to be executed on a section succeeding the latest minimum point may be achieved by extrapolation executed to expand a straight line connecting the latest minimum point to a minimum point immediately preceding the latest minimum point to the current time point.

The model input generator 140 generates input data to a mathematical model based on the values of the maximum points included in the chronological waveform of the crank angle signal values and the values of the minimum points included in the chronological waveform of the crank angle signal values. For example, the model input generator 140 generates input data on the maximum values and input data on the minimum values based on the chronological data of the maximum values and the chronological data of the minimum values.

Figure 11:
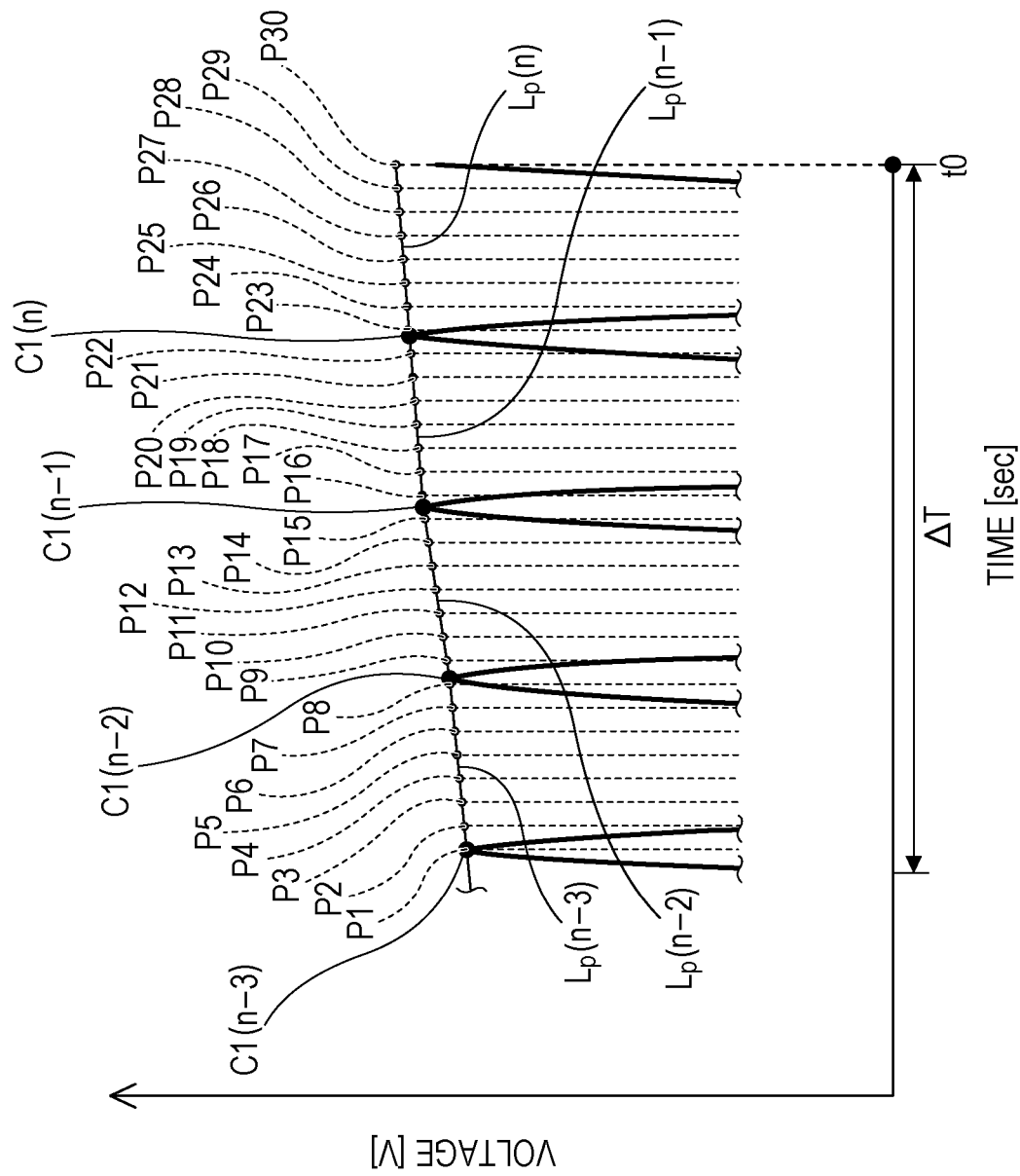
FIG. 11 is an explanatory diagram illustrating an example of a method for generating input data.

Specifically, the model input generator 140 generates the input data on the maximum values based on the chronological data generated by the maximum point chronological data generator 122 and indicating the maximum values. For example, the model input generator 140 generates the input data on the maximum values by extracting values at the latest multiple time points from the chronological data of the maximum values. For example, as illustrated in FIG. 11, the model input generator 140 extracts a predetermined number m1 of values (hereinafter referred to as "input maximum values") for the input data at sampling time intervals $\Delta t$ from chronological data of maximum values obtained during a predetermined past time period $\Delta T$ immediately before a current time point t0. In the first embodiment, as an example, the predetermined time period $\Delta T$=30 milliseconds, each of the sampling time intervals $\Delta t$ is 1 millisecond, and the predetermined number m1=30. In FIG. 11, C1($n$-3), C1($n$-2), C1($n$-1), and C1($n$) indicate four maximum points. $L_p$(n-3), $L_p$(n-2), and $L_p$(n-1) indicate three straight lines, a straight line connecting the maximum points C1($n$-3) and C1($n$-2) to each other, a straight line connecting the maximum points C1($n$-2) and C1($n$-1) to each other, and a straight line connecting the maximum points C1($n$-1) and C1($n$) to each other. $L_p$(n) indicates the expansion of $L_p$(n-1) (the aforementioned interpolation by the extrapolation). In addition, P1 to P30 indicate points on the straight lines $L_p$(n-3), $L_p$(n-2), $L_p$(n-1), and $L_p$(n) at time points spaced at the sampling time intervals $\Delta t$ within the predetermined time period $\Delta T$. In this case, the input data on the maximum values is composed of 30 input maximum values (values of the points P1 to P30). Similarly, the model input generator 140 generates the input data on the minimum values based on the chronological data generated by the minimum point chronological data generator 132 and indicating the minimum values. In the first embodiment, as an example, the input data on the minimum values is composed of 30 input minimum values, like the input data on the maximum values. In this case, the final input data includes the 60 values in total.

The model parameter storage section 150 stores information (mathematical model information) indicating the mathematical model. It is preferable that the mathematical model information include identified values of parameters of the mathematical model information for each of values of revolutions per minute of the engine. This is due to the fact that an identified value of a model parameter from which a highly accurate estimated value of the indicated torque is obtained may significantly change depending on revolutions per minute of the engine. In the first embodiment, as an example, the mathematical model information includes information of functions of the mathematical model and the identified values of the model parameters for each of the values of revolutions per minute of the engine. The identified values of the model parameters for each of the values of revolutions per minute of the engine may be stored in a map data format, for example. Intervals (resolution) between the values of revolutions per minute of the engine are arbitrary, but may be 100 rpm, for example. The mathematical model and the model parameters are described later.

The estimator 160 calculates estimated values of engine torque based on amplitude information indicating the amplitude of the crank angle signal (chronological waveform) and the mathematical model information. Specifically, the estimator 160 calculates the estimated values of the indicated torque by giving input based on the amplitude information of the crank angle signal to the mathematical model. In the first embodiment, as an example, the input based on the amplitude information of the crank angle signal is input data generated by the model input generator 140. If the identified values of the model parameters for each of the values of revolutions per minute of the engine are stored in the model parameter storage section 150, the estimator 160 calculates the estimated values of the indicated torque using the identified values of the model parameters based on the current revolutions per minute of the engine.

The reason why the amplitude information of the crank angle signal is used as the input is that the crank angle sensor 4 has the characteristics in which the voltage output of the crank angle sensor 4 increases when revolutions per minute of the engine increases, as indicated by the experiment results illustrated in FIG. 6. These characteristics are apparent from Equation 1 (this is due to the fact that when revolutions per minute of the engine increases, the rate of changing the magnetic flux $\phi_m$ over time increases). Revolutions per minute of the engine is an index equivalent with a crank angular velocity. In addition, there is a correlation between the crank angular velocity and the indicated torque. Specifically, the crank angular acceleration obtained by differentiating the crank angular velocity with respect to time and the indicated torque t have the following relationship.

$$\tau = J\ddot{\theta} \quad \text{Equation 2}$$

In Equation 2, J is the moment of inertia, and $\ddot{\theta}$ indicates the crank angular acceleration.

It is apparent from the above description that the mathematical model for calculating the indicated torque from the amplitude information of the crank angle signal is built and that the indicated torque is estimated by the mathematical model.

According to the first embodiment, the indicated torque may be estimated using the mathematical model that receives the amplitude information of the crank angle signal, without directly using a calculated value of the crank angular acceleration.

As a comparative example, a method for estimating indicated torque directly using a calculated value of crank angular acceleration is described below. As described above, the calculated value of the crank angular acceleration may be obtained based on a crank angle signal as illustrated in FIG. 3 in the following manner. First, as illustrated in FIG. 3, when the crank angle signal is reduced from a positive value to a negative value while crossing 0 V or is increased from a negative value to a positive value while crossing 0 V, it is detected that the crank angle is advanced by only a predetermined crank angle pitch $\Delta\theta$. Thus, if the number of times that the crank angle signal crosses 0 V is k, and information indicating time when the crank angle signal crosses 0 V is t(k), the crank angle is expressed as follows.

$$\theta(k) = \theta(k-1) + \Delta\theta(k) \quad \text{Equation 3}$$

Thus, a crank angular velocity is expressed as follows.

$$\dot{\theta}(k) = \frac{\Delta\theta(k)}{t(k) - t(k-1)} \quad \text{Equation 4}$$

Thus, the crank angular acceleration is expressed as follows.

$$\ddot{\theta}(k) = \frac{\dot{\theta}(k) - \dot{\theta}(k-1)}{t(k) - t(k-1)} \quad \text{Equation 5}$$

When the calculated value of the crank angular acceleration is obtained in the aforementioned manner, the indicated torque may be estimated using Equation 2.

As described above, it is, however, difficult to accurately calculate the crank angular acceleration due to measurement resolution for angle extraction by the crank angle sensor 4, a limit of sampling cycles, disturbance such as vibration in a high rotation range, and the like. For example, there is a limit on reductions in pitches of shape characteristics (for example, teeth) formed in the signal rotor 5 to increase the measurement resolution. In addition, for example, in order to accurately calculate the time information t(k) indicating the time when the crank angle signal crosses 0 V, sampling cycles for the quantized output are to be reduced and an effect of the disturbance such as the vibration in the high rotation range is to be reduced. These reductions, however, are limited. Thus, in the comparative example, it is difficult to improve the accuracy of estimated values of the indicated torque.

On the other hand, according to the first embodiment, as described above, the indicated torque is estimated using the mathematical model that receives the amplitude information of the chronological waveform of the crank angle signal values. Specifically, according to the first embodiment, as described above, the indicated torque is estimated without directly using a calculated value of the crank angular acceleration. Thus, the accuracy of estimated values of the indicated torque may be improved, compared with the comparative example. A level by which the accuracy is improved in the first embodiment, compared with the comparative example, is described using specific examples of the mathematical model described later.

In addition, according to the first embodiment, the amplitude information of the crank angle signal is to be input to the mathematical model and includes the maximum and minimum values of the chronological waveform of the crank angle signal values. The maximum and minimum values of the chronological waveform of the crank angle signal values may be easily and accurately detected from the chronological waveform of the crank angle signal. Thus, according to the first embodiment, the input data based on the highly accurate amplification information may be generated by a simple process. As a result, the accuracy of estimating the indicated torque is improved.

In addition, according to the first embodiment, as described above, the input data to the mathematical model is information of the amplitude at multiple time points or is chronological data including maximum values (input maximum values) at multiple time points and minimum values (input minimum values) at multiple time points. Specifically, the input data to the mathematical model includes information of the amplitude before the current time point. Thus, the amount of information of the input data to the mathematical model may be increased and the accuracy of estimating the indicated torque may be improved, compared with the case where input data includes only information of the amplitude at the current time point, for example. In a modified example, however, the input data to the mathematical model may include only the information of the amplitude at the current time point or include only either or both of the maximum value (input maximum value) and the minimum value (input minimum value) at the current time.

In addition, according to the first embodiment, as described above, the input data to the mathematical model includes the information of the amplitude at the multiple time points, and time intervals between the multiple time points are equal to the fixed value (sampling time interval Δt). Specifically, the input data to the mathematical model is the amplitude information acquired at the fixed time intervals. Thus, the input data may be generated based on the information of the amplitude at the multiple time points spaced at the time intervals that do not depend on revolutions per minute of the engine. In this case, by executing identification for each of the values of revolutions per minute of the engine, the accuracy of estimating the indicated torque may be improved. In the modified example, however, the input data to the mathematical model may include information (information of the amplitude at multiple time points spaced at time intervals that depend on revolutions per minute of the engine) of the amplitude at multiple points for each predetermined angular pitch, for example.

Next, the specific examples of the mathematical model are described.

It is preferable that the mathematical model receive input x (1 row×a number m of columns) and output model output y (scalar) and be obtained by linear combination of a linear function $f_1(x)$ and a nonlinear function $f_2(x)$. Specifically, the mathematical model is expressed as follows.

$$y=f(x)=f_1(x)+f_2(x) \qquad \text{Equation 6}$$

As an example of the nonlinear function $f_2(x)$, a wavelet network, a sigmoid network estimator, or a piecewise linear function may be used, as described later.

Example of Mathematical Model

As an example of the mathematical model, the wavelet network is used. A method for estimating the indicated torque using the mathematical model achieved by the wavelet network is described below and referred to as "wavelet network model method". The wavelet network is described later. First, the linear function $f_1(x)$ is expressed as follows.

$$f_1(x)=(x-r)PL+d \qquad \text{Equation 7}$$

In Equation 7, r is a vector (1×m matrix) of an average value of a regression vector calculated from input and output data, P is a projection matrix (m×p matrix) and is determined by principal component analysis of estimated data, L is a vector parameter (p×1 matrix), and d is a scalar parameter. Normally, p=m. In the first embodiment, p=m, and m=60 as an example. If an x component included in the input and output data is linearly independent, p<m. In the linear function $f_1(x)$, P, L, and d are included in the model parameters.

In the wavelet network, the nonlinear function $f_2(x)$ is expressed as follows.

$$f_2(x) = \sum_{i=1}^{n_g} w_{sg\_i} g(w_{wg\_i}((x-r)Q - c_{g\_i})) + \sum_{i=1}^{n_h} w_{sh\_i} h(w_{sh\_i}((x-r)Q - c_{h\_i})) \qquad \text{Equation 8}$$

In equation 8, g is a scaling function using $\psi$ as an argument and may be expressed as follows, for example.

$$g(\psi)=\exp(-\tfrac{1}{2}\psi\psi^T) \qquad \text{Equation 9}$$

In Equation 8, h is a wavelet function using $\xi$ as an argument and may be expressed as follows, for example.

$$h(\xi)=(n_\xi-\xi\xi^T)\cdot\exp(-\tfrac{1}{2}\xi\xi^T) \qquad \text{Equation 10}$$

In Equation 8, Q is a projection matrix (m×q matrix) and is determined by principal component analysis of the input and output data. q matches the number of x components used in the scaling function and the wavelet function. $w_{sg}$ and $w_{sh}$ are scaling parameters (scalar), $w_{wg}$ and $w_{wh}$ are wavelet parameters (scalar), and $n_g$ indicates the number of scaling functions. $n_h$ indicates the number of wavelet functions. $c_g$ and $c_h$ are vector parameters (1×q matrix), and $n_\xi$ indicates the number of input variables $\xi$. T is a transpose symbol. Q, $w_{sg}$, $w_{sh}$, $w_{wg}$, $w_{wh}$, $c_g$, and $c_h$ are included in the model parameters. In the first embodiment, as an example, $n_g$ is 0, $n_h$ is 4, and $n_\xi$ is 60.

The model identification (or the identification of the values of the model parameters) is executed in advance (at the stage of design before implementation in the vehicle). Each of the values of the model parameters is identified by setting a window corresponding to a predetermined time period ΔT for chronological data for crank angles of 0 to 720 CA degrees and moving the window. Specifically, input data (for example, the 30 input maximum values and the 30 input minimum values) is generated at window positions, and the model identification is executed based on the input data and measured values of the indicated torque at the last time points corresponding to the window positions. The measured values of the indicated torque may be obtained directly from measured data of pressure within a cylinder, for example. In addition, the model identification is executed for each of the values of revolutions per minute of the engine. The results (or identified values of the model parameters) of the identification are stored in the aforementioned model parameter storage section 150 and used upon an actual operation.

The accuracy of estimated values of the indicated torque in the wavelet network model method is described below with reference to FIGS. 12 to 15.

Figure 12:
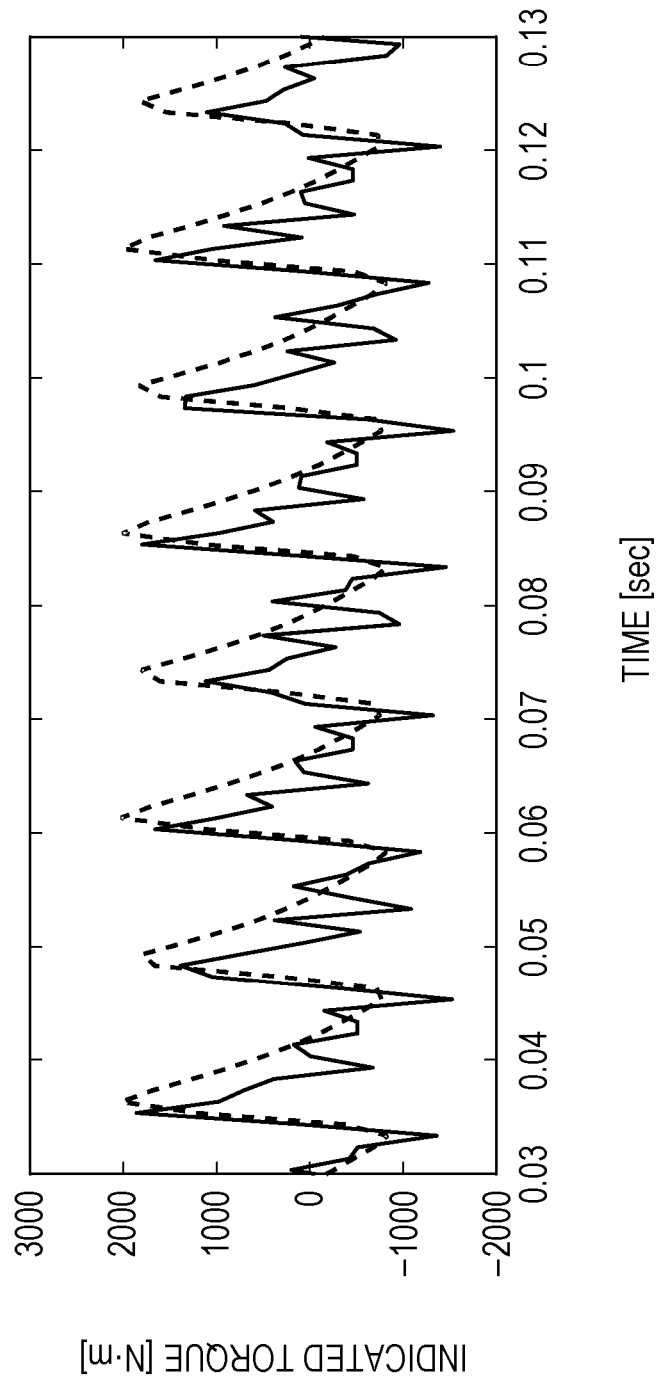
FIG. 12 is a diagram illustrating a waveform of estimated values of indicated torque in a comparative example.
Figure 13:
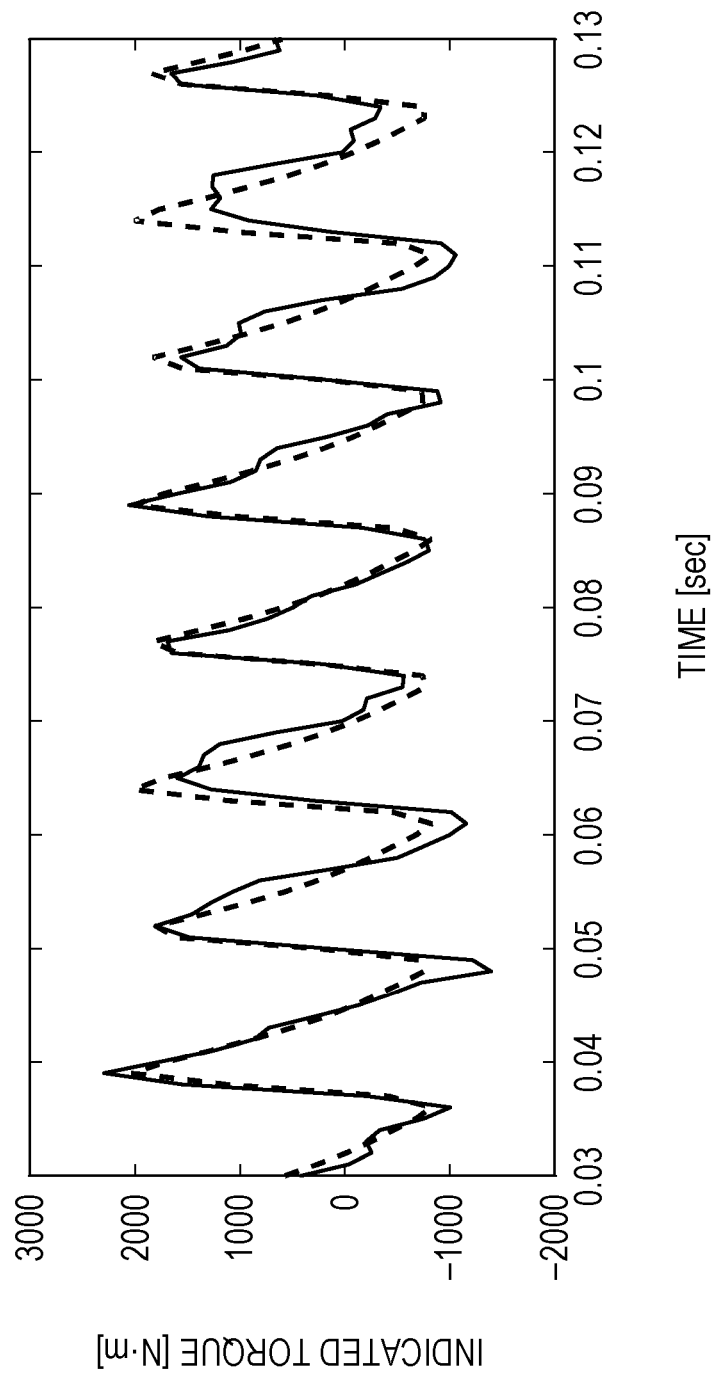
FIG. 13 is a diagram illustrating an example of a waveform of estimated values of indicated torque in a wavelet network model method.
Figure 14:
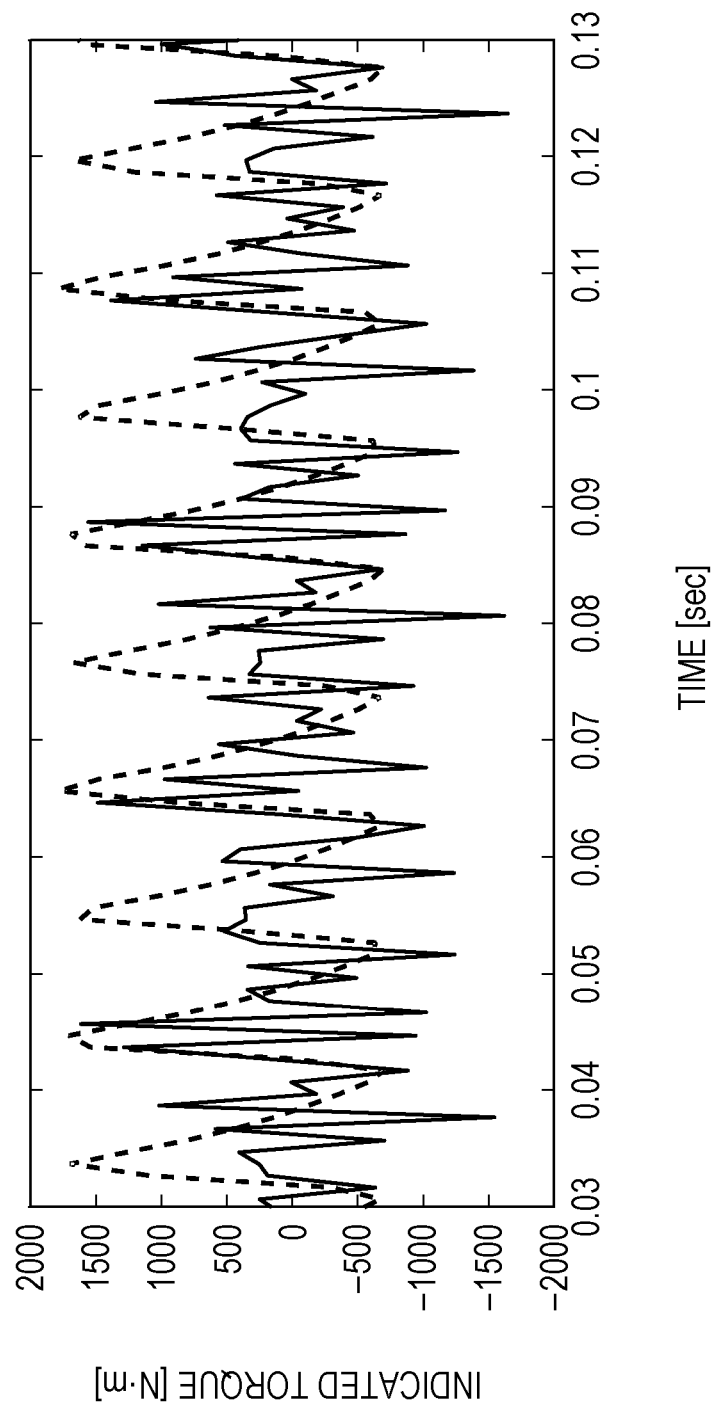
FIG. 14 is a diagram illustrating an example of a waveform of estimated values of the indicated torque in the comparative example.
Figure 15:
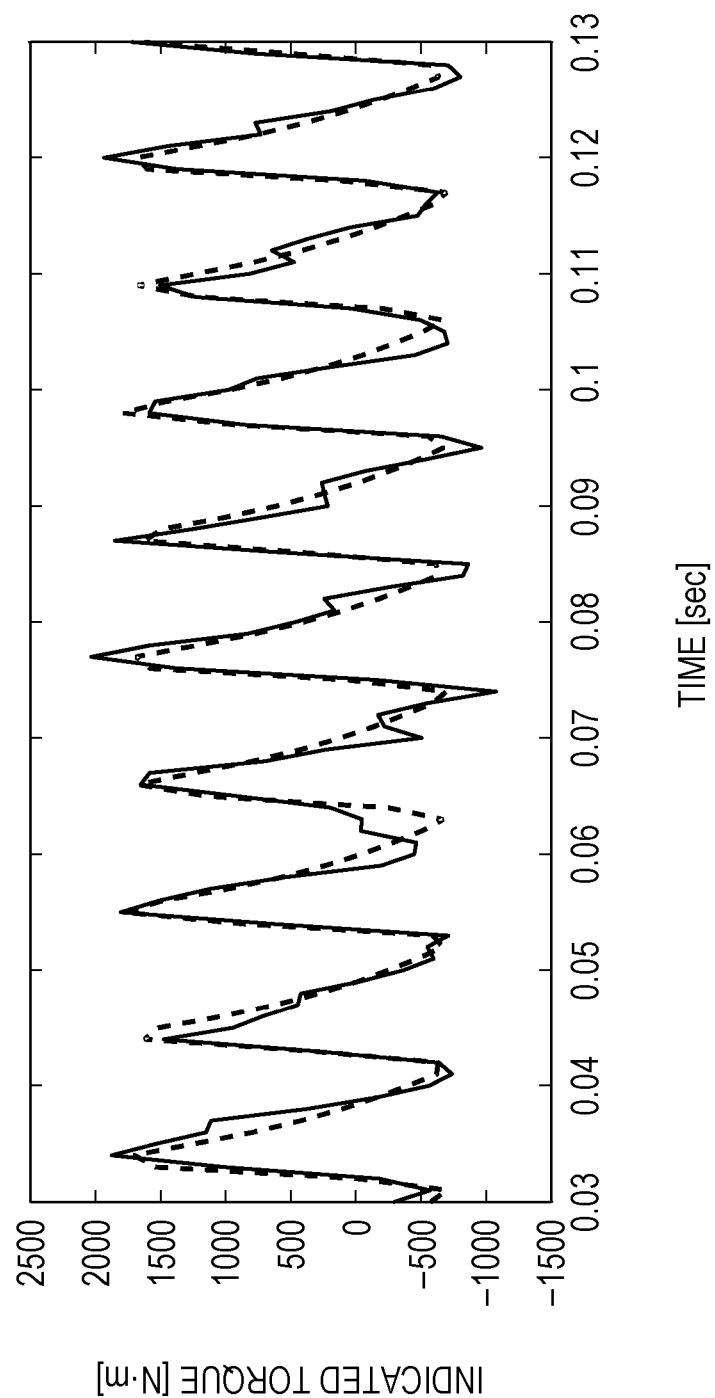
FIG. 15 is a diagram illustrating an example of a waveform of estimated values of the indicated torque in the wavelet network model method.

FIGS. 12 and 14 are diagrams illustrating waveforms of estimated values of indicated torque in the comparative example. The comparative example describes a method for estimating the indicated torque directly using calculated values (calculated values of crank angular acceleration based on crank angles calculated from points that is included in an output waveform of the crank angle sensor 4 and at which the value of the output waveform crosses 0 V) of the crank angular acceleration, as described above. FIGS. 13 and 15 are diagrams illustrating waveforms of estimated values of the indicated torque in the wavelet network model method. In FIGS. 12 and 13, requirements for revolutions per minute of the engine indicate the same value or 2400 rpm. In FIGS. 14 and 15, requirements for revolutions per minute of the engine indicate the same value or 2800 rpm. In FIGS. 12 to 15, ordinates indicate the indicated torque, abscissas indicate time, waveforms of estimated values of the indicated torque are indicated by solid lines, and waveforms of measured values (experimental values) of the indicated torque are indicated by broken lines. The measured values and the estimated values are compared and verified by cross-validation.

When revolutions per minute of the engine is 2400 rpm, an error of the estimation of the indicated torque is large in the comparative example as illustrated in FIG. 12, but the indicated torque is estimated with a relatively small error in the wavelet network model method. A root mean squared error (RMSE) of the estimation results obtained in the comparative example is 821.5, while an RMSE of the estimation results obtained in the wavelet network model method is 436.6 and reduced by approximately 47%.

When revolutions per minute of the engine is 2800 rpm, the indicated torque is not accurately estimated during most of a time period in the comparative example as illustrated in FIG. 14, but the indicated torque is estimated with a relatively small error in the wavelet network model method. An RMSE of the estimation results in the comparative example is 963.7, while an RMSE of the estimation results in the wavelet network model method is 338.1 and reduced by approximately 65%.

Another Example of Mathematical Model

In another example of the mathematical model, a sigmoid network estimator is used, instead of the wavelet network. A method for estimating the indicated torque using the mathematical model achieved by the sigmoid network estimator is described below and referred to as "sigmoid network model method". In the sigmoid network model method, a linear function $f_1(x)$ is the same as that expressed by Equation 7, and a nonlinear function $f_2(x)$ expressed by the following Equation 11 is used.

$$f_2(x) = \sum_{i=1}^{n_\phi} w_{\alpha\_i} \phi(w_{\beta\_i}(x^T - \gamma_i))$$ Equation 11

In Equation 11, $w_{\alpha\_i}$ is a scaling parameter (scalar), $w_{\beta\_i}$ is a vector parameter (1×m matrix), and $\gamma_i$ is a vector parameter (m×1 matrix). In addition, $\phi$ is a sigmoid function using an argument $\zeta$ and may be expressed as follows, for example.

$$\phi(\zeta) = (e^\zeta + 1)^{-1}$$ Equation 12

In this case, $w_{\alpha\_i}$, $w_{\beta\_i}$, and $\gamma_i$ are included in the model parameters.

Figure 16:
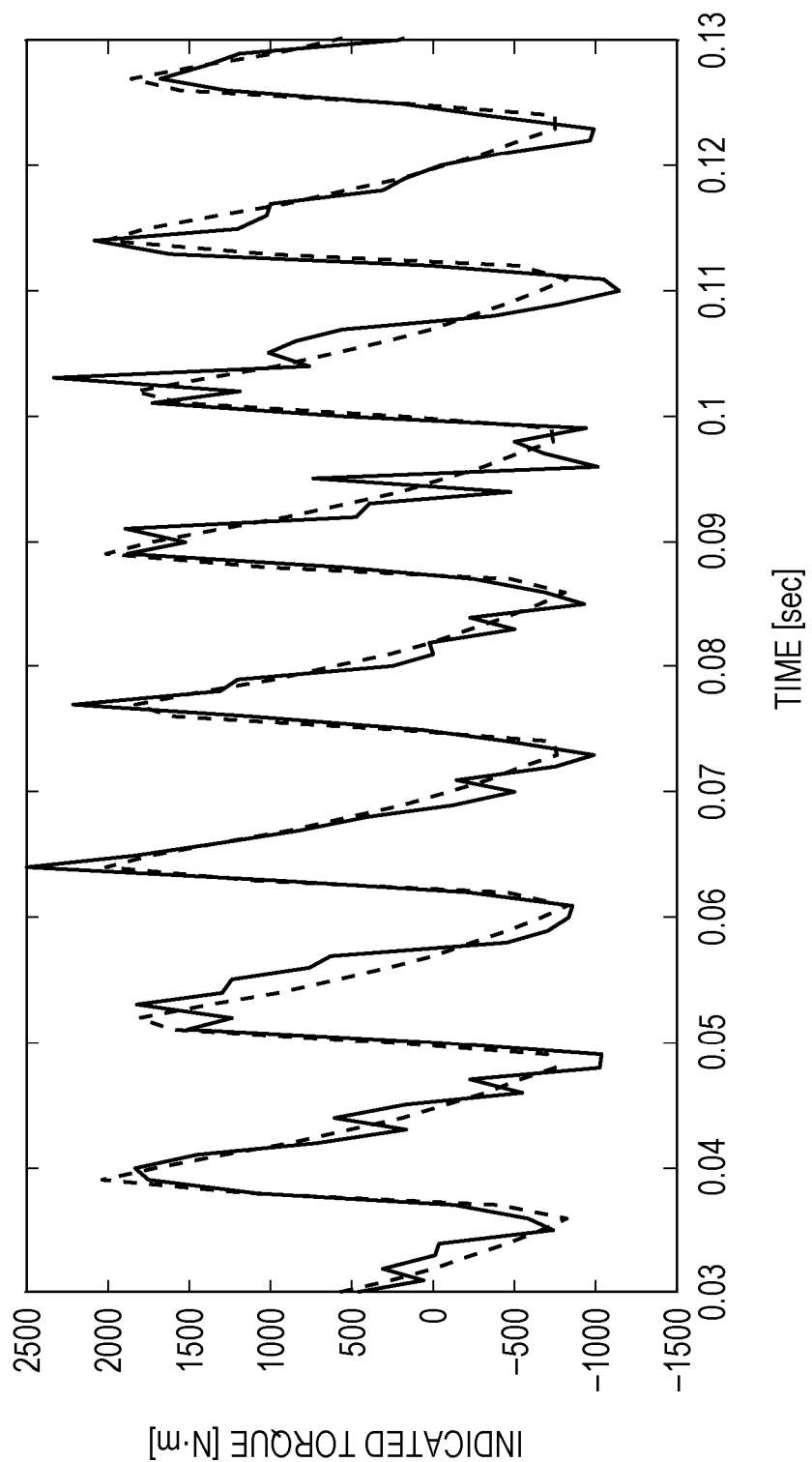
FIG. 16 is a diagram illustrating a waveform of estimated values of the indicated torque in a sigmoid network model method.

The accuracy of estimated values of the indicated torque in the sigmoid network model method is described below with reference to FIG. 16. FIG. 16 is a diagram illustrating a waveform of the estimated values of the indicated torque in the sigmoid network model method. Requirements for revolutions per minute of the engine indicate 2400 rpm. In FIG. 16, the ordinate indicates the indicated torque, the abscissa indicates time, the waveform of the estimated values of the indicated torque is indicated by a solid line, and a waveform of measured values (experimental values) of the indicated torque is indicated by a broken line. The measured values and the estimated values are compared and verified by cross-validation. As illustrated in FIG. 16, an RMSE is 454.8, and it is apparent that the accuracy of the estimation is improved, compared with the RMSE of 821.5 in the comparative example.

Still Another Example of Mathematical Model

In still another example of the mathematical model, a piecewise linear function is used. A method for estimating the indicated torque using the mathematical model achieved by the piecewise linear function is described below and referred to as "piecewise linear function model method". In the piecewise linear function model method, a linear function $f_1(x)$ is the same as that expressed by Equation 7, and a piecewise linear function is used as a nonlinear function $f_2(x)$. In the piecewise linear function, a section in a domain of an input variable is divided into a finite number of small sections, and linear functions are represented in the small sections. The piecewise linear function $f_2(x)$ in each of the small sections j may be expressed as follows, for example (refer to FIG. 12).

$$f_2(x) = \alpha_j x^T + \beta_j$$ Equation 13

In Equation 13, $\alpha_j$ (1×m vector) and $\beta_j$ (scalar) are parameters of the linear function in each of the small sections j. $\alpha_j$ and $\beta_j$ in each of the small sections j are included in the model parameters.

Figure 17:
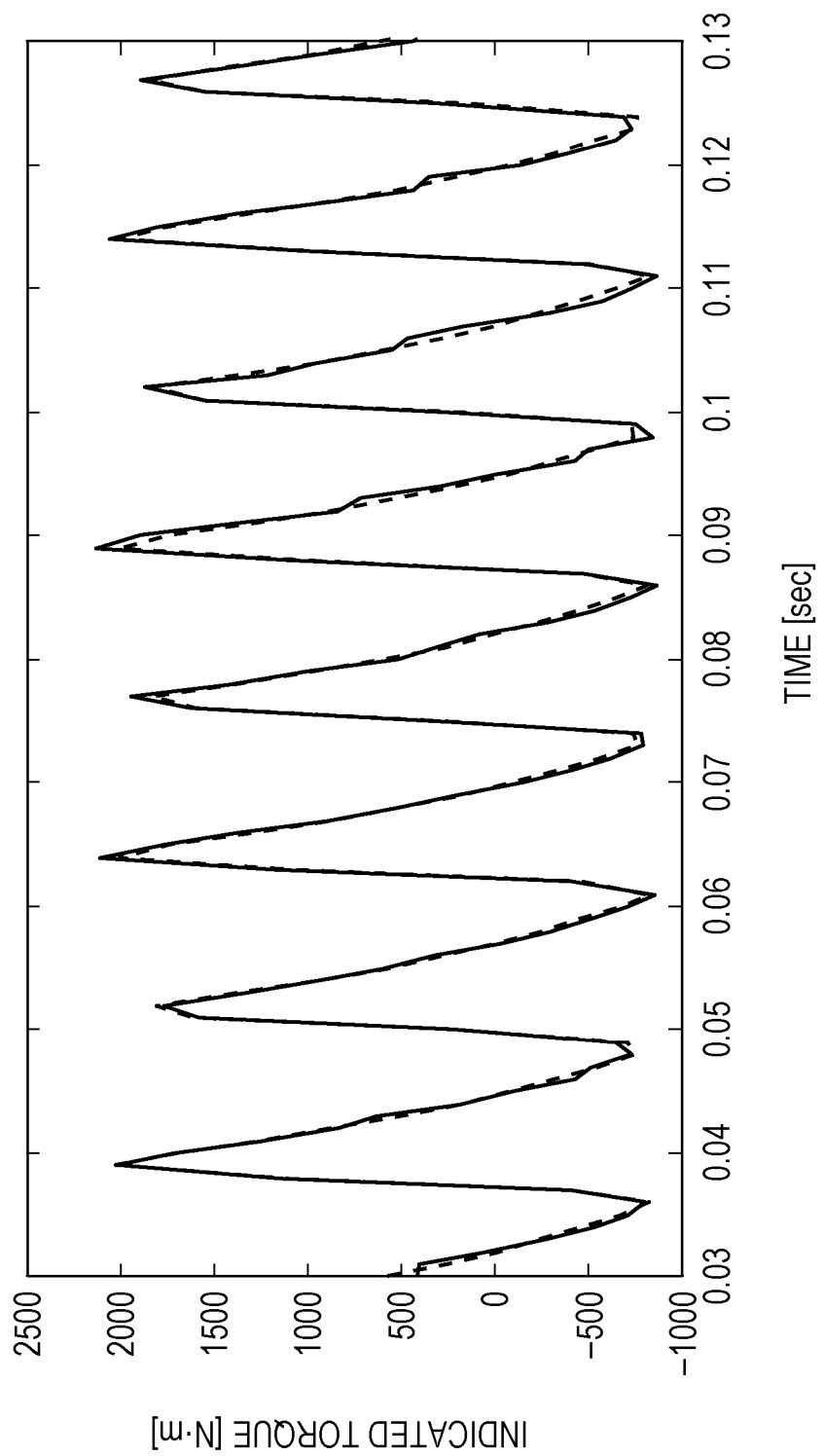
FIG. 17 is a diagram illustrating a waveform of estimated values of the indicated torque in a piecewise linear function model method.

The accuracy of estimated values of the indicated torque in the piecewise linear function model method is described below with reference to FIG. 17. FIG. 17 is a diagram illustrating a waveform of the estimated values of the indicated torque in the piecewise linear function model method. Requirements for revolutions per minute of the engine indicate 2400 rpm. In FIG. 17, the ordinate indicates the indicated torque, the abscissa indicates time, the waveform of the estimated values of the indicated torque is indicated by a solid line, and a waveform of measured values (experimental values) of the indicated torque is indicated by a broken line. The measured values and the estimated values are compared and verified by cross-validation. As illustrated in FIG. 17, an RMSE is 291.4, and it is apparent that the accuracy of the estimation is improved, compared with the RMSE of 821.5 in the comparative example (refer to FIG. 12).

Next, an example of the flow of a torque estimation process by the engine torque estimating device 10 is described with reference to FIG. 18.

Figure 18:
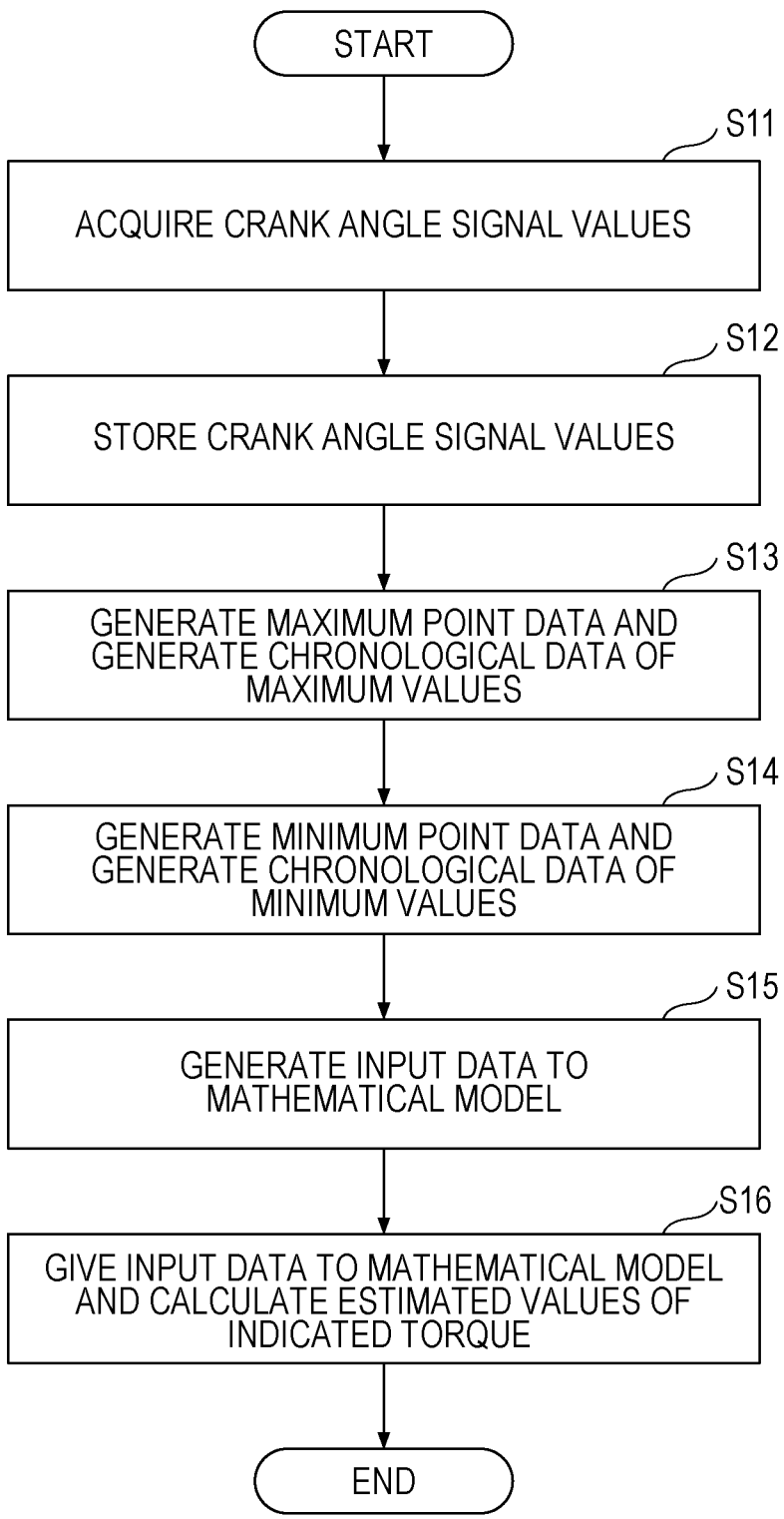
FIG. 18 is a flowchart illustrating an example of the flow of a torque estimation process by the engine torque estimating device according to the first embodiment.

FIG. 18 is a flowchart illustrating an example of the flow of the torque estimation process by the engine torque estimating device 10. The torque estimation process illustrated in FIG. 18 may be executed for each of predetermined intervals Δtp during the time when an ignition switch of the vehicle is in an ON state. Each of the predetermined intervals Δtp is a fixed time period in which data is sampled. For example, each of the predetermined intervals Δtp is 20 milliseconds.

In step S11, the crank angle signal acquirer 111 acquires (sampling) crank angle signal values in a current period based on the crank angle signal for which the gain has been adjusted by the gain adjuster 112.

In step S12, the crank angle signal acquirer 111 causes the crank angle signal values acquired in the current period to be stored in the crank angle signal storage section 114. In the crank angle signal storage section 114, the multiple crank angle signal values (or a chronological waveform of the crank angle signal values) obtained during the latest predetermined time period are stored according to the first-in first-out (FIFO) method, for example.

In step S13, the maximum point acquirer 120 generates maximum point data based on the crank angle signal values stored in the crank angle signal storage section 114. The method for generating the maximum data is described above. Then, the maximum point chronological data generator 122 generates chronological data of maximum values based on the maximum point data generated by the maximum point acquirer 120. The method for generating the chronological data of the maximum values is described above.

In step S14, the minimum point acquirer 130 generates minimum point data based on the crank angle signal values stored in the crank angle signal storage section 114. The method for generating the minimum point data is described above. Then, the minimum point chronological data generator 132 generates chronological data of minimum values based on the minimum point data generated by the minimum point acquirer 130. The method for generating the chronological data of the minimum values is described above.

In step S15, the model input generator 140 generates input data to the mathematical model based on the chronological data generated in step S13 and indicating the maximum values and the chronological data generated in step S14 and indicating the minimum values. The method for generating the input data is described above.

In step S16, the estimator 160 reads, from the model parameter storage section 150, identified values of the model parameters based on current revolutions per minute of the engine and inputs the input data generated in step S15 to the mathematical model based on the read identified values. By giving the input data x generated in step S15 to the mathematical model, output values y are obtained. The estimator 160 treats the output values y, obtained in this manner, of the mathematical model as estimated values of the current indicated torque. The current revolutions per minute of the engine may be obtained from the result of detecting the toothless portion of the signal rotor 5, as described above.

In the process illustrated in FIG. 18, the estimated values of the current indicated torque may be obtained for each of the predetermined intervals Δtp. Specifically, in the process illustrated in FIG. 18, the estimated values of the current indicated torque are calculated by generating the input data for each of the predetermined intervals Δtp based on information of the amplitude of the crank angle signal and giving the input data to the mathematical model. Thus, even if a requirement for revolutions per minute of the engine indicates a high rotational value, the indicated torque may be estimated with high accuracy without inconvenience (or a reduction in the accuracy of the estimation) that occurs in the aforementioned comparative example. Thus, the engine torque estimating device 10 may be effectively used to improve the performance of an engine control system.

In the process illustrated in FIG. 18, step S14 may be executed before step S13.

In the engine control system for torque-based control, net torque is determined from an accelerator operation by a driver in general, and a target value of the indicated torque that leads to the net torque is set. In this case, it is considered that a cylinder internal pressure sensor is used to measure the current indicated torque in order to execute feedback control to set driving torque of an actual vehicle to the target value in the actual vehicle. Under existing circumstances, it is difficult to install the cylinder internal pressure sensor, since the installation of the cylinder internal pressure sensor may cause problems with cost, durability, and maintenance.

According to the first embodiment, however, a cylinder internal pressure sensor is not installed, the indicated torque may be estimated by the engine torque estimating device 10 with high accuracy, and the engine torque estimating device 10 may be effectively used to improve the performance of the engine control system.

Figure 19:
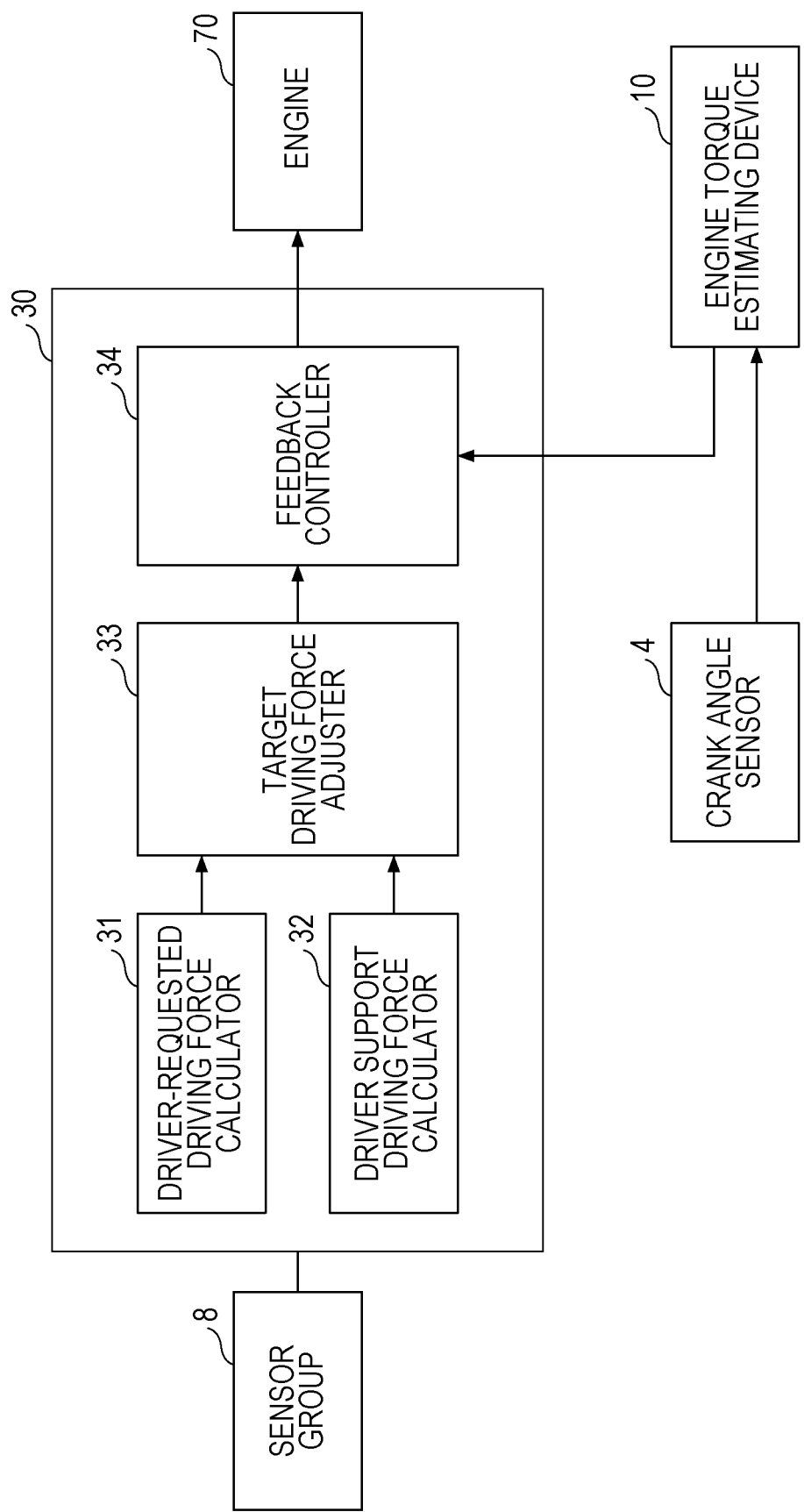
FIG. 19 is a diagram illustrating an example of an engine control system including the engine torque estimating device.

FIG. 19 is a diagram illustrating an example of an engine control system including the engine torque estimating device 10.

An engine control system 2 is installed in a vehicle. The vehicle may be a vehicle using only an engine as a driving source or may be a hybrid vehicle, as described above. The engine control system 2 includes a sensor group 8, an engine control device 30 (an example of an engine controller), an engine 70, the crank angle sensor 4, and the engine torque estimating device 10.

The sensor group 8 includes an accelerator position sensor, a vehicle speed sensor, a radar sensor, an image sensor, and the like as various in-vehicle sensors other than the crank angle sensor 4, for example.

The engine control device 30 electronically controls the engine 70. The electronic control of the engine 70 may be achieved by electronically controlling the opening (or throttle opening) of a throttle valve installed in an intake manifold of the engine 70, although not illustrated, for example. Alternatively, the electronic control of the engine 70 may be achieved by electronically controlling the amount of fuel to be sprayed into a combustion chamber of the engine 70, or by electronically controlling the timing of ignition, or by electronically controlling the phase of an intake camshaft for adjusting the timing of opening and closing the valve.

The engine control device 30 may be an electronic control unit (ECU) and may have the hardware configuration illustrated in FIG. 2, for example. The engine control device 30 includes a driver-requested driving force calculator 31, a driver support driving force calculator 32, a target driving force adjuster 33, and a feedback controller 34, as illustrated in FIG. 19.

The driver-requested driving force calculator 31 calculates driver-requested driving force (hereinafter referred to as "first requested driving force") for the speed of the vehicle and the position of an accelerator of the vehicle based on information received from the vehicle speed sensor and the accelerator position sensor.

The driver support driving force calculator 32 calculates requested driving force (hereinafter referred to as "second requested driving force") for supporting the driving of the vehicle by the driver, based on information received from the radar sensor and the like. For example, the second requested driving force may be driving force for traveling at a predetermined speed, driving force for following another vehicle traveling in front of the vehicle, driving force for limiting the speed of the vehicle to a value that does not exceed a speed limit, or the like.

The target driving force adjuster 33 selects either the first requested driving force or the second requested driving force in accordance with a predetermined rule. For example, during the time when adaptive cruise control (ACC) is executed and the first requested driving force is 0, the target driving force adjuster 33 selects the second requested driving force. During the time when the ACC is executed and the first requested driving force is larger than a predetermined value, the target driving force adjuster 33 selects the first requested driving force. The target driving force adjuster 33 converts the selected requested driving force to a torque expression (N·m) and gives the torque expression as requested driving torque to the feedback controller 34.

The feedback controller 34 may determine a target control value of the engine 70 based on the difference between the requested driving force given by the target driving force adjuster 33 and an estimated value given by the engine torque estimating device 10 and indicating the indicated torque so that the requested driving torque is achieved. For example, the target control value of the engine may be a target value of the opening of the throttle, a target value of the amount of fuel to be sprayed, or the like. Instead of the estimated value of the indicated torque, a value indicating the net torque and estimated based on the estimated value of the indicated torque may be equivalently used. For example, the net torque may be calculated by subtracting friction torque of the engine from the estimated value of the indicated torque. In addition, the friction torque of the engine may be calculated based on revolutions per minute of the engine and the load of the engine. In addition, the feedback controller 34 may determine a target value of the timing of the ignition as the target control value of the engine based on the estimated value given by the engine torque estimating device 10 and indicating the indicated torque. The feedback controller 34 controls the engine 70 so that the determined target control value is achieved.

The engine control system 2 illustrated in FIG. 19 includes the engine torque estimating device 10 and may execute the feedback control to control the engine 70 based on the difference between the requested driving force and the estimated value of the indicated torque. As described above, since the accuracy of the estimated values obtained by the engine torque estimating device 10 and indicating the indicated torque is high, the driving torque of the engine 70 may be controlled with high accuracy. Thus, an excess amount of fuel is not sprayed into the cylinder, the performance of the engine is improved, and the fuel efficiency and the drivability are improved. In the aforementioned manner, the engine torque estimating device 10 may be effectively used to improve the performance of the engine control system.

In the example illustrated in FIG. 19, the engine torque estimating device 10 is separated from the engine control device 30, but is not limited to this. All or one or more of the functions of the engine torque estimating device 10 may be achieved by the engine control device 30.

In the example illustrated in FIG. 19, the engine control system 2 uses the results of the estimation by the engine torque estimating device 10 to control the engine 70, but is not limited to this. The engine control system 2 may use the results of the estimation by the engine torque estimating device 10 to control a vehicle driving device (for example, a transmission, an electric motor, a clutch, or the like) other than the engine 70. A target control value (for example, a target gear position of the transmission) of the vehicle driving device other than the engine 70 may be related to the target control value of the engine 70.

Second Embodiment

Figure 20:
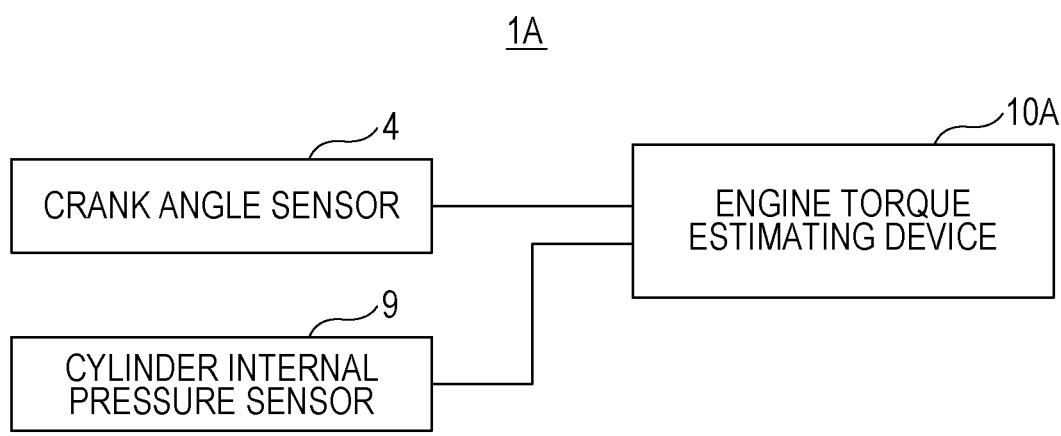
FIG. 20 is a configuration diagram illustrating an example of an engine torque estimation system according to a second embodiment.

FIG. 20 is a configuration diagram illustrating an example of an engine torque estimation system 1A according to a second embodiment. The engine torque estimation system 1A according to the second embodiment is different from the engine torque estimation system 1 (refer to FIG. 1) according to the first embodiment in that a cylinder internal pressure sensor 9 is added to the engine torque estimation system 1A and that the engine torque estimating device 10 is replaced with an engine torque estimating device 10A.

The cylinder internal pressure sensor 9 is installed for only one or more of cylinders. In the second embodiment, as an example, an engine is an in-line four-cylinder engine, and the cylinder internal pressure sensor 9 is installed for only a cylinder with a cylinder number 1 among cylinder numbers 1 to 4. The cylinder with the cylinder number 1 is hereinafter referred to as "first cylinder", a cylinder with the cylinder number 2 is hereinafter referred to as "second cylinder", and the same applies to the other cylinders.

The engine torque estimating device 10A according to the second embodiment may have the same hardware configuration of the engine torque estimating device 10 according to the first embodiment, but functions of the engine torque estimating device 10A according to the second embodiment are different from the functions of the engine torque estimating device 10 according to the first embodiment as described below.

Figure 21:
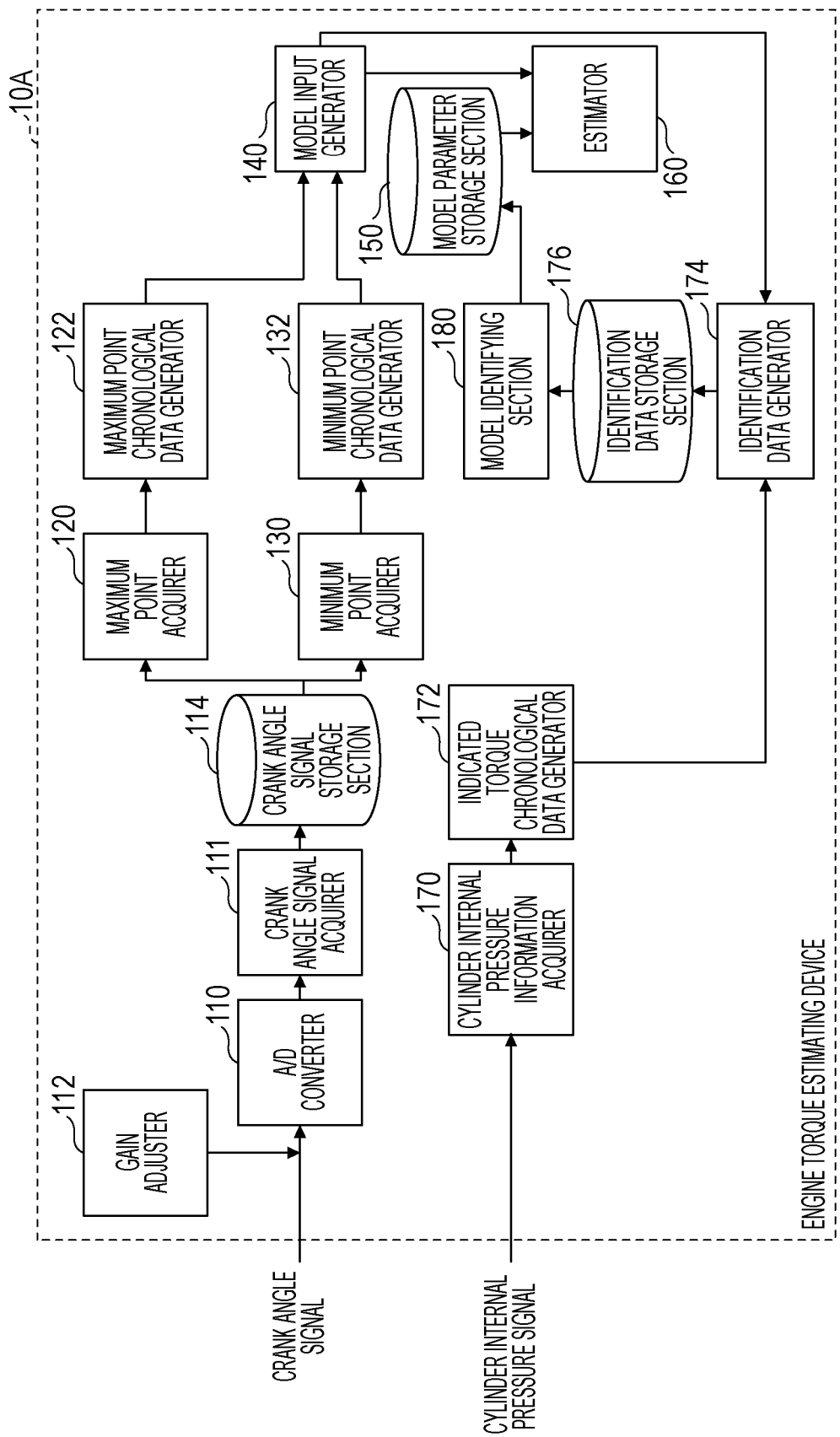
FIG. 21 is a functional block diagram illustrating an engine torque estimating device according to the second embodiment.

FIG. 21 is a functional block diagram of the engine torque estimating device 10A according to the second embodiment.

The engine torque estimating device 10A according to the second embodiment is different from the engine torque estimating device 10 according to the first embodiment in that the engine torque estimating device 10A additionally includes the following configuration. Specifically, the engine torque estimating device 10A additionally includes a cylinder internal pressure information acquirer 170, an indicated torque chronological data generator 172, an identification data generator 174, an identification data storage section 176, and a model identifying section 180. The sections 170, 172, 174, and 180 may be achieved by causing the controller 101 to execute a program stored in the main storage unit 102. The identification data storage section 176 may be achieved by the auxiliary storage unit 103.

The cylinder internal pressure information acquirer 170 acquires a measured value (cylinder internal pressure signal) of pressure within the cylinder from the cylinder internal pressure sensor 9.

The indicated torque chronological data generator 172 generates chronological data of indicated torque obtained during a time period during which the first cylinder is on its expansion stroke (explosion stroke) based on measured data (chronological data for the crank angles of 0 to 720 CA degrees) acquired by the cylinder internal pressure information acquirer 170 and indicating the pressure within the cylinder, for example. The indicated torque is the total of torque generated by the first to fourth cylinders, but torque generated by the cylinder on its expansion stroke is dominant. Thus, the time period during which the first cylinder is on its expansion stroke is an "identification time period". The torque generated by the first cylinder may be calculated directly from the pressure within the first cylinder. Torque generated by the second to fourth cylinders may be estimated based on the measured data of the pressure within the first cylinder. For example, torque generated by a cylinder on its exhaust stroke in the identification time period when revolutions per minute of the engine is a certain value may be estimated based on measured data indicating pressure within the cylinder and obtained when revolutions per minute of the engine is the certain value and the first cylinder is on its exhaust stroke.

The identification data generator 174 generates identification data. The identification data includes chronological data generated by the indicate torque chronological data generator 172 and indicating the indicated torque and input data generated by the model input generator 140. The input data included in the identification data is identification data generated for each of the predetermined intervals Δtp in the identification time period. The identification data generator 174 causes the identification data to be stored in the identification data storage section 176.

The identification data storage section 176 stores (accumulates) the identification data. The identification data storage section 176 stores identification data for each of the values of revolutions per minute of the engine.

The model identifying section 180 executes a process of identifying the values of the model parameters of the mathematical model based on the identification data stored in the identification data storage section 176. The mathematical model and the model parameters are described above. The method for the identification process is described above, but the identification process is achieved for each of the values of revolutions per minute of the engine in the following manner. The values of the model parameters are identified based on the input data so that values based on chronological data of the indicated torque at multiple time points (for example, time points spaced at the predetermined intervals Δtp) in the identification time period are the model output y. The model identifying section 180 causes the identified values of the model parameters for each of the values of revolutions per minute of the engine to be stored in the model parameter storage section 150.

Next, an example of a model identification process by the engine torque estimating device 10A is described with reference to FIG. 22. A torque estimation process by the engine torque estimating device 10A may be the same as the aforementioned torque estimation process illustrated in FIG. 18. In the second embodiment, however, as described above, the mathematical model information that is stored in the model parameter storage section 150 and to be used in the torque estimation process is generated and stored upon an actual operation of the vehicle, instead of being stored in advance (at the stage of the design before implementation in the vehicle). This feature is different from the first embodiment.

FIG. 22 is a flowchart illustrating the example of the model identification process by the engine torque estimating device 10A. The model identification process illustrated in FIG. 22 is executed in real time in synchronization with the aforementioned torque estimation process. In a modified example, however, the model identification process illustrated in FIG. 22 may be executed offline, for example.

In step S200, the cylinder internal pressure information acquirer 170 determines whether or not the first cylinder is on its expansion stroke. If the result of the determination indicates YES, the process proceeds to step S202. If the result of the determination indicates NO, the process proceeds to step S208.

In step S202, the cylinder internal pressure information acquirer 170 acquires a measured value of the pressure within the first cylinder.

In step S204, the indicated torque chronological data generator 172 causes the measured value of the current pressure within the cylinder to be stored in a first predetermined region of the RAM of the main storage unit 102 based on a cylinder internal pressure signal acquired in step S202. The first predetermined region of the RAM has a capacity sufficient to store multiple measured values indicating the pressure within the first cylinder and acquired during the time when the first cylinder is on its expansion stroke.

In step S206, the identification data generator 174 acquires, from the model input generator 140, input data in a current period and causes the acquired input data to be stored in a second predetermined region of the RAM of the main storage unit 102. The second predetermined region of the RAM has a capacity sufficient to store multiple sets of input data acquired during the time when the first cylinder is on its expansion stroke.

In step S208, the identification data generator 174 determines whether or not the data stored (buffered) in the first and second predetermined regions of the RAM during the time when the first cylinder is on its expansion stroke is already stored in (transferred to) the identification data storage section 176. If the result of the determination indicates YES, the process in the current period is terminated. If the result of the determination indicates NO, the process in the current period proceeds to step S210.

In step S210, the identification data generator 174 associates the data stored in the first and second predetermined regions of the RAM with current revolutions per minute of the engine and causes the data stored in the first and second predetermined regions of the RAM to be stored in the identification data storage section 176. After the identification data generator 174 causes the data stored in the first and second predetermined regions of the RAM to be stored in the identification data storage section 176, the identification data generator 174 deletes the data stored in the first and second predetermined regions of the RAM. In this manner, every time an expansion stroke is performed in the first cylinder, identification data is associated with revolutions per minute of the engine upon the expansion stroke and accumulated in the identification data storage section 176. Identification data obtained during the time when an expansion stroke is performed in the first cylinder once is referred to as "single set" of identification data. The single set of identification data includes a measured value of the pressure within the first cylinder and input data for each of multiple time points during the expansion stroke performed in the first cylinder.

In step S212, the model identifying section 180 determines whether or not the model identification is to be executed. For example, if a model identification requirement is satisfied, the model identifying section 180 determines that the model identification is to be executed. The model identification requirement is arbitrary. For example, the model identification requirement may be periodically satisfied. Alternatively, if the number of sets of identification data in the identification data storage section 176 for each of the values of revolutions per minute of the engine is equal to or larger than a predetermined number, the model identification requirement may be satisfied. If the result of the determination indicates YES, the process in the current period proceeds to step S214. If the result of the determination indicates NO, the process in the current period is terminated.

In step S214, the model identifying section 180 executes the process of identifying the values of the model parameters of the mathematical model based on the identification data accumulated in the identification data storage section 176. The identification process is described above.

In step S216, the model identifying section 180 causes the identified values of the model parameters for each of the values of revolutions per minute of the engine to be stored in the model parameter storage section 150, based on the results of the identification of step S214.

As described above, in the second embodiment, since the engine torque estimation system 1A includes the cylinder internal pressure sensor 9, the torque estimation process illustrated in FIG. 18 may be executed even in a state in which the engine torque estimation system 1A is implemented in the vehicle (or a state after the shipment of the vehicle). Specifically, in the second embodiment, the mathematical model information stored in the model parameter storage section 150 may be regularly or irregularly updated in the state in which the engine torque estimation system 1A is implemented in the vehicle. Thus, even if characteristics of the engine vary depending on the engine, the values of the model parameters may be modified based on the variation in the characteristics. In addition, even if a characteristic of the engine has changed over time, the values of the model parameters may be updated.

In addition, in the second embodiment, since the cylinder internal pressure sensor 9 is installed for only the single cylinder, a simple configuration may be achieved and problems (cost, durability, and maintenance) caused by the installation of the cylinder internal pressure sensor may be reduced, compared with the case where cylinder internal pressure sensors are installed for all the cylinders.

The engine torque estimating device 10A according to the second embodiment may be used, instead of the engine torque estimating device 10 (or the engine torque estimating device 10 according to the first embodiment) of the engine control system 2 illustrated in FIG. 19. In this case, only during an expansion stroke performed in the first cylinder among strokes corresponding to crank angles of 0 to 720 CA degrees, calculated values (obtained by the indicated torque chronological data generator 172) of the indicated torque based on values measured by the cylinder internal pressure sensor 9 may be used, instead of estimated values of the indicated torque based on the mathematical model.

Although the embodiments are described above, the embodiments are not limited to the specific embodiments. The embodiments may be variously modified and changed within the scope of the appended claims. In addition, all or two or more of the constituent elements described in the embodiments may be combined.

For example, in each of the aforementioned first and second embodiments, the input data to the mathematical model includes both of the input data on the minimum values and the input data on the maximum values, but may include either of the input data on the minimum values and the input data on the maximum values. In another embodiment, input data based on the amplitude information may be generated and used. For example, the input data may be generated by synthesizing the input data on the minimum values with the input data on the maximum values and used. In addition, the input data may be generated by averaging amplitude information at multiple time points and used. Furthermore, wave heights (differences between minimum and maximum values chronologically adjacent to each other) may be used as the amplitude information.

In addition, in the aforementioned first and second embodiments, the output y of the mathematical model is the indicated torque, but another parameter (torque obtained by subtracting external load torque from the net torque or the indicated torque, or the like) may be used instead of the indicated torque.

In addition, in the aforementioned first and second embodiments, the A/D converter 110 is included in each of the engine torque estimating devices 10 and 10A, but the A/D converter 110 may be included in a sensor unit including the crank angle sensor 4.

In addition, in the aforementioned first and second embodiments, the target is the vehicle including the engine as an example, but the target is arbitrary. For example, the target may be a railway vehicle including an engine, a ship including an engine, a construction machine including an engine, a motorcycle (a type of vehicle) including an engine, an airplane including an engine, a helicopter including an engine, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An engine torque estimating device comprising:
   a memory; and
   a processor coupled to the memory and configured to execute a process, the process including:
   acquiring, from a crank angle sensor installed for a crankshaft of an engine, a chronological waveform in which amplitude changes based on a rotational speed of the crankshaft;
   generating input data to a mathematical model based on information of the amplitude of the chronological waveform; and
   calculating an estimated value of engine torque by processing the generated input data with the mathematical model,
   wherein the chronological waveform includes a first section in which maximum points and minimum points of the amplitude alternately occur while the value of the chronological waveform crosses 0 (zero) amplitude due to rotation of the crankshaft, and a second section for detection of a top dead center, and
   wherein the information of the amplitude includes either or both of values of the maximum points and values of the minimum points in the first section of the chronological waveform,
   wherein the process further includes executing first chronological data generation to generate chronological data of maximum values of the amplitude based on multiple maximum points, and
   wherein in the generating of the input data to the mathematical model, the input data is generated based on the chronological data of the maximum values.

2. The engine torque estimating device according to claim 1,
   wherein the chronological data of the maximum values includes a value on a straight line connecting the multiple maximum points to each other.

3. The engine torque estimating device according to claim 1,
   wherein the input data includes values included in the chronological data of the maximum values and the values obtained at multiple time points spaced at fixed time intervals within a latest predetermined time period.

4. The engine torque estimating device according to claim 1,
   wherein the engine torque is indicated torque.

5. The engine torque estimating device according to claim 1,
   wherein the process further includes:
   acquiring a measured value of pressure within a cylinder from a cylinder internal pressure sensor installed for one or more of multiple cylinders of the engine; and
   identifying a value of a parameter of the mathematical model based on the acquired measured value of the pressure within the cylinder and the generated input data; and
   wherein in the calculating of the estimated value of the engine torque, the estimated value is calculated based on the mathematical model for which the value of the parameter has been identified.

6. The engine torque estimating device according to claim 1,
   wherein the process further includes executing second chronological data generation to generate chronological data of minimum values of the amplitude based on multiple minimum points, and
   wherein in the generating of the input data to the mathematical model, the input data is generated based on the chronological data of the minimum values.

7. The engine torque estimating device according to claim 6, wherein the chronological data of the minimum values includes a value on a straight line connecting the multiple minimum points to each other.

8. The engine torque estimating device according to claim 6,
wherein the input data includes values included in the chronological data of the minimum values and the values obtained at multiple time points spaced at fixed time intervals within a latest predetermined time period.

9. The engine torque estimating device according to claim 1,
wherein the mathematical model is expressed by linear combination of a linear function and a nonlinear function.

10. The engine torque estimating device according to claim 9,
wherein the nonlinear function includes a wavelet function and a scaling function.

11. The engine torque estimating device according to claim 9,
wherein the nonlinear function is a piecewise linear function.

12. The engine torque estimating device according to claim 1,
wherein a value of a parameter of the mathematical model is identified based on a measured value of pressure within a cylinder for each of values of revolutions per minute of the engine.

13. The engine torque estimating device according to claim 12,
wherein the processor uses a value of the parameter based on current revolutions per minute of the engine.

14. The engine torque estimating device according to claim 1,
wherein the crank angle sensor is of a magnetic pickup type.

15. The engine torque estimating device according to claim 14,
wherein the process further includes adjusting a gain for the chronological waveform or the input data.

16. The engine torque estimating device according to claim 15,
wherein in the adjusting of the gain, the gain is adjusted so that an output voltage characteristic of the crank angle sensor matches a defined standard characteristic.

17. An engine torque estimating method performed by a computer, the method comprising:
acquiring, from a crank angle sensor installed for a crankshaft of an engine, a chronological waveform in which amplitude changes based on a rotational speed of the crankshaft;
generating input data to a mathematical model based on information of the amplitude of the chronological waveform; and
calculating an estimated value of engine torque by processing the generated input data with the mathematical model,
wherein the chronological waveform includes a first section in which maximum points and minimum points of the amplitude alternately occur while the value of the chronological waveform crosses 0 (zero) amplitude due to rotation of the crankshaft, and a second section for detection of a top dead center, and
wherein the information of the amplitude includes either or both of values of the maximum points and values of the minimum points in the first section of the chronological waveform,
wherein the process further includes executing first chronological data generation to generate chronological data of maximum values of the amplitude based on multiple maximum points, and
wherein in the generating of the input data to the mathematical model, the input data is generated based on the chronological data of the maximum values.

18. An engine torque estimating system comprising:
an engine;
a crank angle sensor installed for a crankshaft of the engine;
an acquiring circuit for acquiring, from the crank angle sensor, a chronological waveform in which amplitude changes based on a rotational speed of the crankshaft;
a generating circuit for generating input data to a mathematical model based on information of the amplitude of the chronological waveform;
a calculating circuit for calculating an estimated value of engine torque by processing the generated input data with the mathematical model; and
a control circuit for controlling the engine based on the estimated value of engine torque,
wherein the chronological waveform includes a first section in which maximum points and minimum points of the amplitude alternately occur while the value of the chronological waveform crosses 0 (zero) amplitude due to rotation of the crankshaft, and a second section for detection of a top dead center, and
wherein the information of the amplitude includes either or both of values of the maximum points and values of the minimum points in the first section of the chronological waveform,
wherein the process further includes executing first chronological data generation to generate chronological data of maximum values of the amplitude based on multiple maximum points, and
wherein in the generating of the input data to the mathematical model, the input data is generated based on the chronological data of the maximum values.

* * * * *